(12) United States Patent
Iwai et al.

(10) Patent No.: US 8,103,115 B2
(45) Date of Patent: Jan. 24, 2012

(54) INFORMATION PROCESSING APPARATUS, METHOD, AND PROGRAM

(75) Inventors: Yoshiaki Iwai, Tokyo (JP); Takayuki Yoshigahara, Tokyo (JP); Akira Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1007 days.

(21) Appl. No.: 12/070,956

(22) Filed: Feb. 22, 2008

(65) Prior Publication Data

US 2008/0205764 A1 Aug. 28, 2008

(30) Foreign Application Priority Data

Feb. 26, 2007 (JP) ................................. 2007-044996
Jul. 31, 2007 (JP) ................................. 2007-199227

(51) Int. Cl.
*G06K 9/46* (2006.01)
(52) U.S. Cl. ........................................ 382/246; 382/199
(58) Field of Classification Search .................. 382/171, 382/195, 199, 201, 203, 205, 246
See application file for complete search history.

(56) References Cited

U.S. PATENT DOCUMENTS

| | | | | |
|---|---|---|---|---|
| 5,881,171 A | * | 3/1999 | Kinjo | 382/199 |
| 6,650,778 B1 | * | 11/2003 | Matsugu et al. | 382/209 |
| 2006/0147094 A1 | * | 7/2006 | Yoo | 382/117 |

FOREIGN PATENT DOCUMENTS

JP 6 274602 9/1994

OTHER PUBLICATIONS

D.G. Lowe, "Object Recognition from Local Scale-Invariant Features", ICCV, 1999.
S. Belongie, "Shape Matching and Object Recognition Using Shape Contexts", vol. 24, No. 24, Apr. 2002.
F. Jurie, "Scale-invariant shape features for recognition of object categories", CVPR, 2004.

* cited by examiner

*Primary Examiner* — Matthew Bella
*Assistant Examiner* — Dennis Rosario
(74) *Attorney, Agent, or Firm* — Frommer Lawrence & Haug LLP; William S. Frommer; Thomas F. Presson

(57) ABSTRACT

An information processing apparatus that compares an input image with a model image to identify the subject of the input image with the subject of the model image. The apparatus includes feature value extraction means for setting feature points, each of which is on an edge of the model image and provided to extract a model image feature value, which is the feature value of the model image, and extracting the model image feature value from each of a plurality of feature value extraction areas in the neighborhood of each of the feature points, and matching means for checking if an input image feature value, which is the feature value of the input image, at the point that is on an edge of the input image and corresponds to the feature point matches any of the plurality of model image feature values at the feature point.

10 Claims, 26 Drawing Sheets

INFORMATION PROCESSING APPARATUS, METHOD, AND PROGRAM

CROSS REFERENCES TO RELATED APPLICATIONS

The present invention contains subject matter related to Japanese Patent Application JP2007-044996 and JP2007-199227 filed in the Japanese Patent Office on Feb. 26, 2007 and Jul. 31, 2007, respectively, the entire contents of which being incorporated herein by reference.

BACKGROUND OF THE INVENTION

1. Field of the Invention

The present invention relates to an information processing apparatus, method, and program, particularly to an information processing apparatus, method, and program for recognizing an object in an image.

2. Description of the Related Art

Recognition of an object present in an image, for example, captured by a camera, has been studied for a long time. The majority of such studies have been how to describe the object in perspective, that is, how to recognize the object by preparing a texture template for the entire object and applying the template to the entire object to check if the object matches the template. Such methods, however, have difficulty in recognizing an object in a captured image, for example, when part of the object is hidden or the image includes a complicated background.

To address such a problem, there has recently been proposed a method that is very robust to a partially hidden portion of an object, a complicated background and the like in a captured image by describing the object using a local feature value and carrying out matching between local feature values (for example, see D. G. Lowe, "Object Recognition from local scale—invariant features", ICCV, 1999, hereinafter referred to as the non-patent document 1).

There have been proposed a large number of methods for recognizing a less-textured object by using the shape of the contour of the object, such as edges. The majority of the edge-based recognition methods also use perspective description, so that they have significant difficulty in extracting the contour of an entire object in a typical image. Further, as described above, the methods using perspective description have difficulty in recognizing an object when part of the object is hidden or the background is complicated.

To address such problems, there have recently been proposed methods for locally describing an edge based on the above-mentioned method for describing texture by using a local feature value (for example, see S. Belongie, J. Malik, and J. Puzicha, "Shape Matching and Object Recognition Using Shape Contexts", PAMI, 2002, and F. Jurie and C. Schmid, "Scale—invariant shape features for recognition of object categories", CVPR, 2004, hereinafter referred to as the non-patent documents 2 and 3).

SUMMARY OF THE INVENTION

Although the method described in the non-patent document 1 is very effective for a sufficiently-textured object, it is difficult to apply the method to a less-textured object. On the other hand, it cannot currently be said that the methods described in the non-patent documents 2 and 3 are not sufficiently robust to a typical image including a partially hidden portion and a complicated background.

In view of such circumstances, it is desirable to more reliably recognize an object in a typical image including partially a partially hidden portion and a complicated background.

An information processing apparatus according to an embodiment of the invention compares an input image with a model image to identify the subject of the input image with the subject of the model image. The information processing apparatus includes feature value extraction means for setting feature points, each of which is on an edge of the model image and provided to extract a model image feature value, which is the feature value of the model image, and extracting the model image feature value from each of a plurality of feature value extraction areas in the neighborhood of each of the feature points, and matching means for checking if an input image feature value, which is the feature value of the input image, at the point that is on an edge of the input image and corresponds to the feature point matches any of the plurality of model image feature values at the feature point.

The feature value extraction means can extract multiple types of the model image feature value from each of the plurality of feature value extraction areas, and the matching means can carry out the matching operation for each of the multiple types.

The feature value extraction means can be configured to extract the model image feature value from each of the plurality of feature value extraction areas, the model image feature value having successive values for each pixel in the neighborhood of an edge of the model image.

The feature value extraction means can be configured to extract an edge intensity from each of the plurality of feature value extraction areas, the edge intensity obtained in the neighborhood of an edge of the model image.

The feature value extraction means can be configured to extract the model image feature value, which is the feature value of the model image, from each of the plurality of feature value extraction areas in the neighborhood of the feature point defined as the point where a reference circle determined in such a way that a relatively large number of edges of the model image are contained therein intersects an edge of the model image.

The feature value extraction means can be configured to extract the feature value from each of small areas obtained by radially segmenting each of the feature value extraction areas that is formed of a plurality of concentric circles having different radii, each of the segmented areas having a predetermined angle, and surrounded by the outermost concentric circle, the extracted feature values expressed by a two-dimensional histogram for the distance and angle from the center of the concentric circles.

The information processing apparatus can further include identification means for identifying the subject of the input image with the subject of the model image when the number of matching pairs, which is the result of the operation for checking if the input image feature value matches any of the plurality of model image feature values, is greater than a predetermined value.

An information processing method according to another embodiment of the invention is used in an information processing apparatus that compares an input image with a model image to identify the subject of the input image with the subject of the model image. The information processing method includes the steps of setting feature points, each of which is on an edge of the model image and provided to extract a model image feature value, which is the feature value of the model image, and extracting the model image feature value from each of a plurality of feature value extraction areas in the neighborhood of each of the feature points, and checking if an input image feature value, which is the feature value of the input image, at the point that is on an edge of the input image and corresponds to the feature point matches any of the plurality of model image feature values at the feature point.

A program according to another embodiment of the invention is a program that causes a computer to carry out a process for comparing an input image with a model image to identify the subject of the input image with the subject of the model image. The process includes the steps of setting feature points, each of which is on an edge of the model image and provided to extract a model image feature value, which is the feature value of the model image, and extracting the model image feature value from each of a plurality of feature value extraction areas in the neighborhood of each of the feature points, and checking if an input image feature value, which is the feature value of the input image, at the point that is on an edge of the input image and corresponds to the feature point matches any of the plurality of model image feature values at the feature point.

In an embodiment of the invention, after feature points, each of which is on an edge of a model image and provided to extract a model image feature value, which is the feature value of the model image, are set, the model image feature value is extracted from each of a plurality of feature value extraction areas in the neighborhood of each of the feature points, and checking is carried out to see if an input image feature value, which is the feature value of an input image, at the point that is on an edge of the input image and corresponds to the feature point matches any of the plurality of model image feature values at the feature point.

As described above, according to the embodiments of the invention, an object in an image can be recognized. In particular, according to the embodiments of the invention, an object in a typical image including a partially hidden portion and a complicated background can be more reliably recognized.

DESCRIPTION OF THE PREFERRED EMBODIMENTS

Before embodiments of the invention are described below, how the configuration requirements of the invention corresponds to the embodiments described in the text or the drawings is explained as follows by way of example: The description in this paragraph is to confirm that embodiments that support the invention are described in the text or the drawings. Therefore, when there is an embodiment described in the text or the drawings but not described as corresponding to one or more of the configuration requirements of the invention, it does not mean that the embodiment does not correspond to the one or more of the configuration requirements. Conversely, when an embodiment is described herein as corresponding to one or more of the configuration requirements, it does not mean that the embodiment exclusively corresponds to the one or more of the configuration requirements.

The information processing apparatus according to an embodiment of the invention compares an input image with a model image to identify the subject of the input image with the subject of the model image. The information processing apparatus includes feature value extraction means for setting feature points, each of which is on an edge of the model image and provided to extract a model image feature value, which is the feature value of the model image, and extracting the model image feature value from each of a plurality of feature value extraction areas in the neighborhood of each of the feature points, (a model feature value extractor 55 in FIG. 1, for example), and matching means for checking if an input image feature value, which is the feature value of the input image, at the point that is on an edge of the input image and corresponds to the feature point matches any of the plurality of model image feature values at the feature point (a matching section 66 in FIG. 1, for example).

Figure 22:
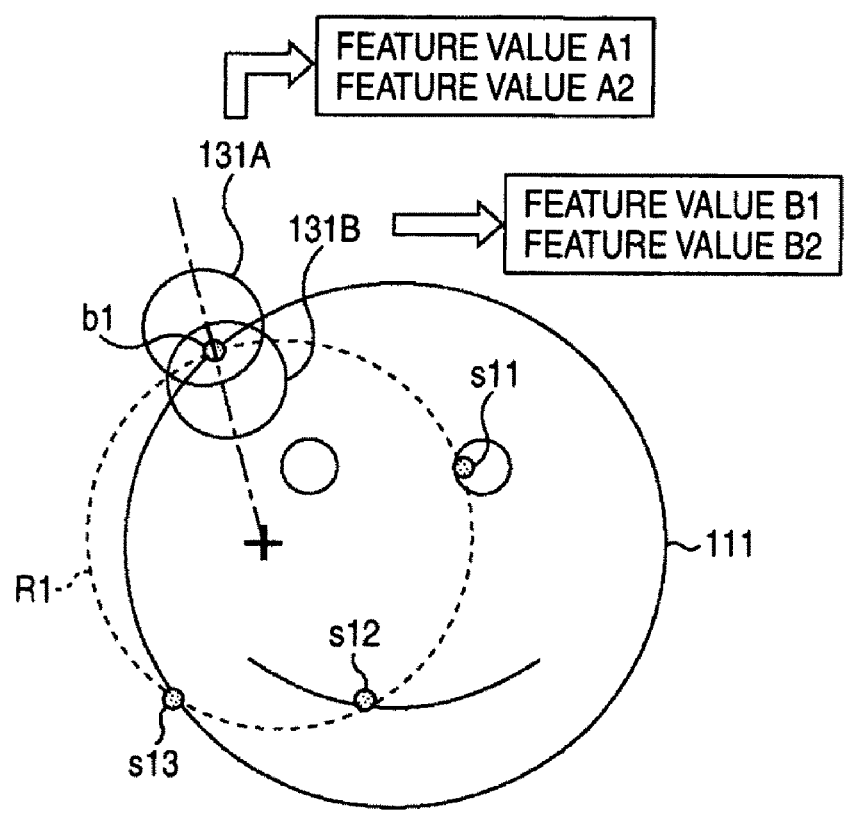
FIG. 22 explains extraction of multiple types of feature values in a feature value extraction area.
Figure 24:
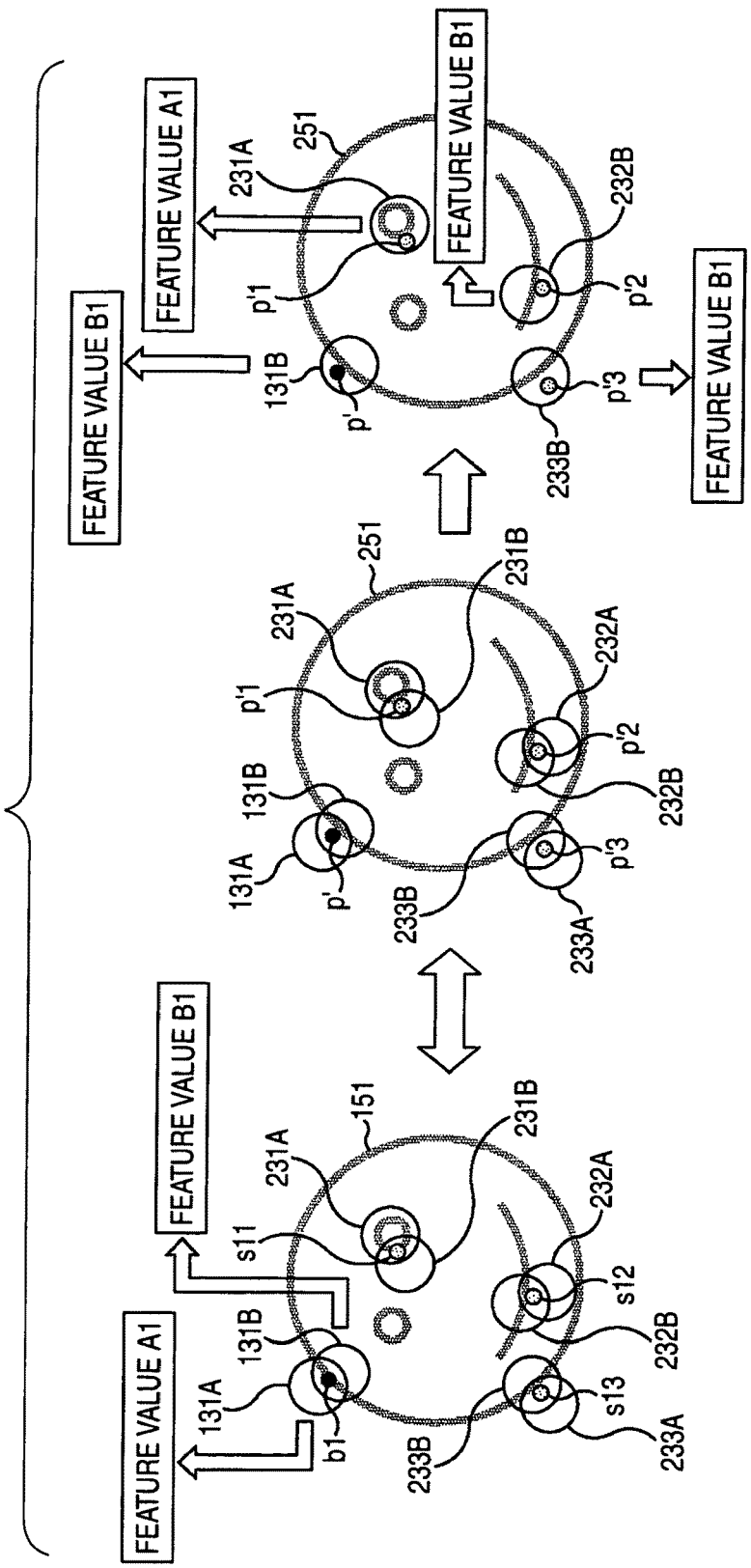
FIG. 24 shows an example of operation for checking if a first type of multiple model feature values match a target feature value of the first type.
Figure 25:
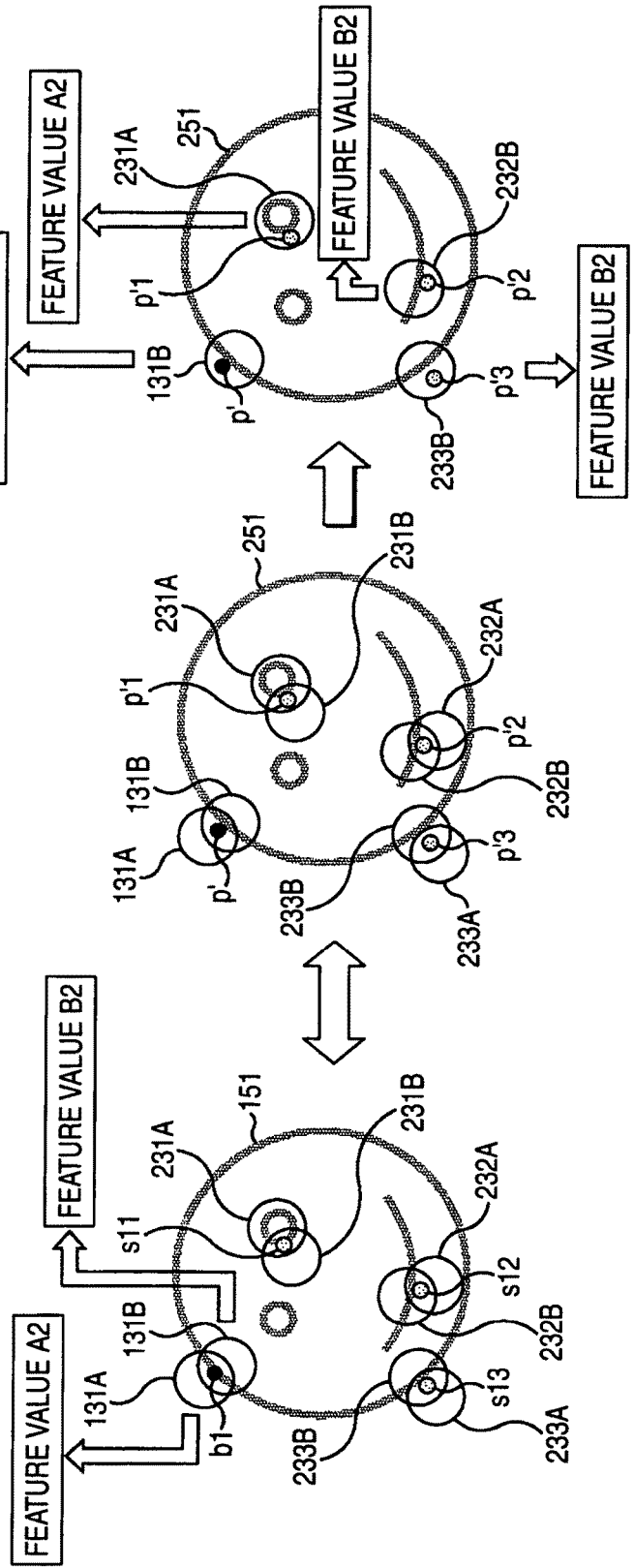
FIG. 25 shows an example of operation for checking if a second type of multiple model feature values match a target feature of value the second type.

The feature value extraction means can be configured to extract multiple types of the model image feature value from each of the plurality of feature value extraction areas (in the example in FIG. 22, for example, a first type of feature value A1 and a second type of feature value A2 are extracted from a feature value extraction area 131A, and a feature value B1 of the first type and a feature value B2 of the second type are extracted from a feature value extraction area 131B, and the matching means can be configured to carry out the matching operation for each of the multiple types (for example, the matching operation for the first type is carried out as shown in FIG. 24, and the matching operation for the second type is carried out as shown in FIG. 25).

Figure 4:
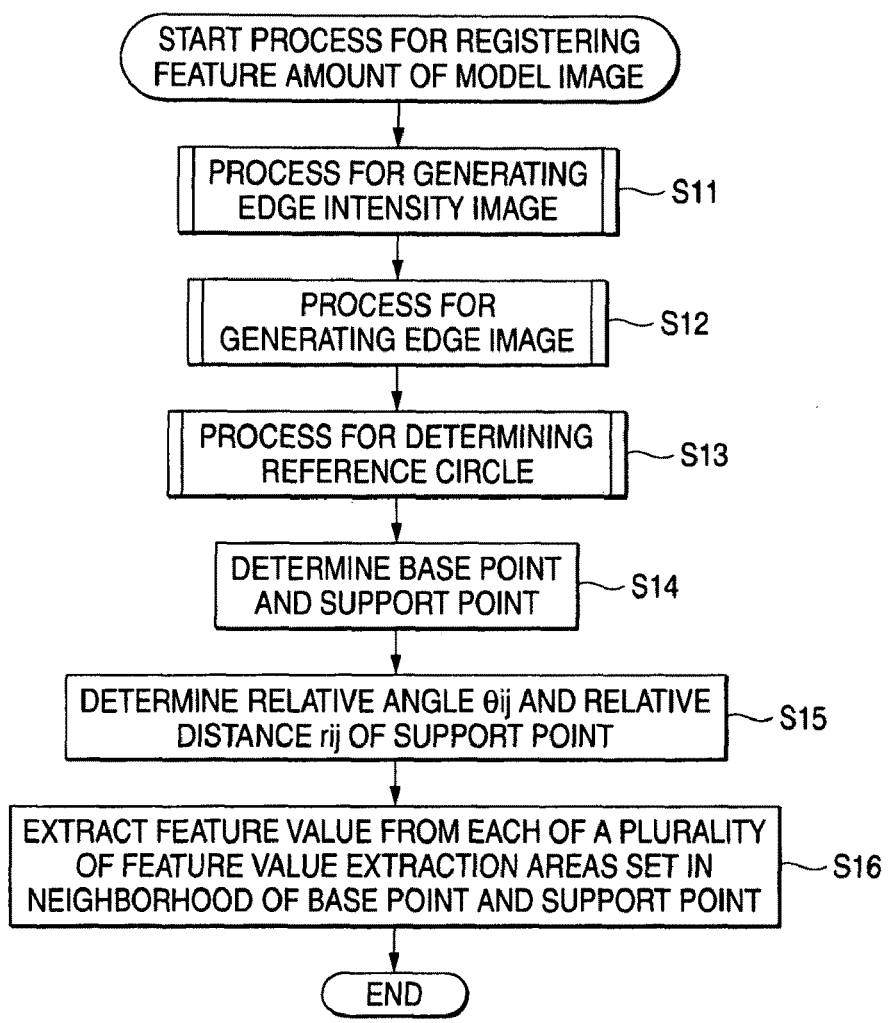
FIG. 4 is a flowchart for explaining the process for registering feature values of a model image.

The feature value extraction means can be configured to extract the model image feature value from each of the plurality of feature value extraction areas, the model image feature value having successive values for each pixel in the neighborhood of an edge of the model image (the step S16 in FIG. 4, for example).

The feature value extraction means can be configured to extract an edge intensity from each of the plurality of feature value extraction areas, the edge intensity obtained in the neighborhood of an edge of the model image (the step S16 in FIG. 4, for example).

The feature value extraction means can be configured to extract the model image feature value, which is the feature value of the model image, from each of the plurality of feature value extraction areas in the neighborhood of the feature point defined as the point where a reference circle determined in such a way that a relatively large number of edges of the model image are contained therein intersects an edge of the model image (the step S16 in FIG. 4, for example).

The feature value extraction means can be configured to extract the feature value from each of small areas obtained by radially segmenting each of the feature value extraction areas that is formed of a plurality of concentric circles having different radii, each of the segmented areas having a predetermined angle, and surrounded by the outermost concentric circle, the extracted feature values expressed by a two-dimensional histogram for the distance and angle from the center of the concentric circles (the step S16 in FIG. 4, for example).

The information processing apparatus can further include identification means (an object identifier 67 in FIG. 1, for example) for identifying the subject of the input image with the subject of the model image when the number of matching pairs, which is the result of the operation for checking if the input image feature value matches any of the plurality of model image feature values, is greater than a predetermined value.

The information processing method according to another embodiment of the invention is used in an information processing apparatus that compares an input image with a model image to identify the subject of the input image with the subject of the model image. The information processing method includes the steps of setting feature points, each of which is on an edge of the model image and provided to extract a model image feature value, which is the feature value of the model image, and extracting the model image feature value from each of a plurality of feature value extraction areas in the neighborhood of each of the feature points (the step S16 in FIG. 4, for example), and checking if an input image feature value, which is the feature value of the input image, at the point that is on an edge of the input image and corresponds to the feature point matches any of the plurality of model image feature values at the feature point (the step S94 in FIG. 18, for example).

The program according to another embodiment of the invention causes a computer to carry out a process for comparing an input image with a model image to identify the subject of the input image with the subject of the model image. The program includes the steps of setting feature points, each of which is on an edge of the model image and provided to extract a model image feature value, which is the feature value of the model image, and extracting the model image feature value from each of a plurality of feature value extraction areas in the neighborhood of each of the feature points (the step S16 in FIG. 4, for example), and checking if an input image feature value, which is the feature value of the input image, at the point that is on an edge of the input image and corresponds to the feature point matches any of the plurality of model image feature values at the feature point (the step S94 in FIG. 18, for example).

Embodiments of the invention will be described below with reference to the drawings.

Figure 1:
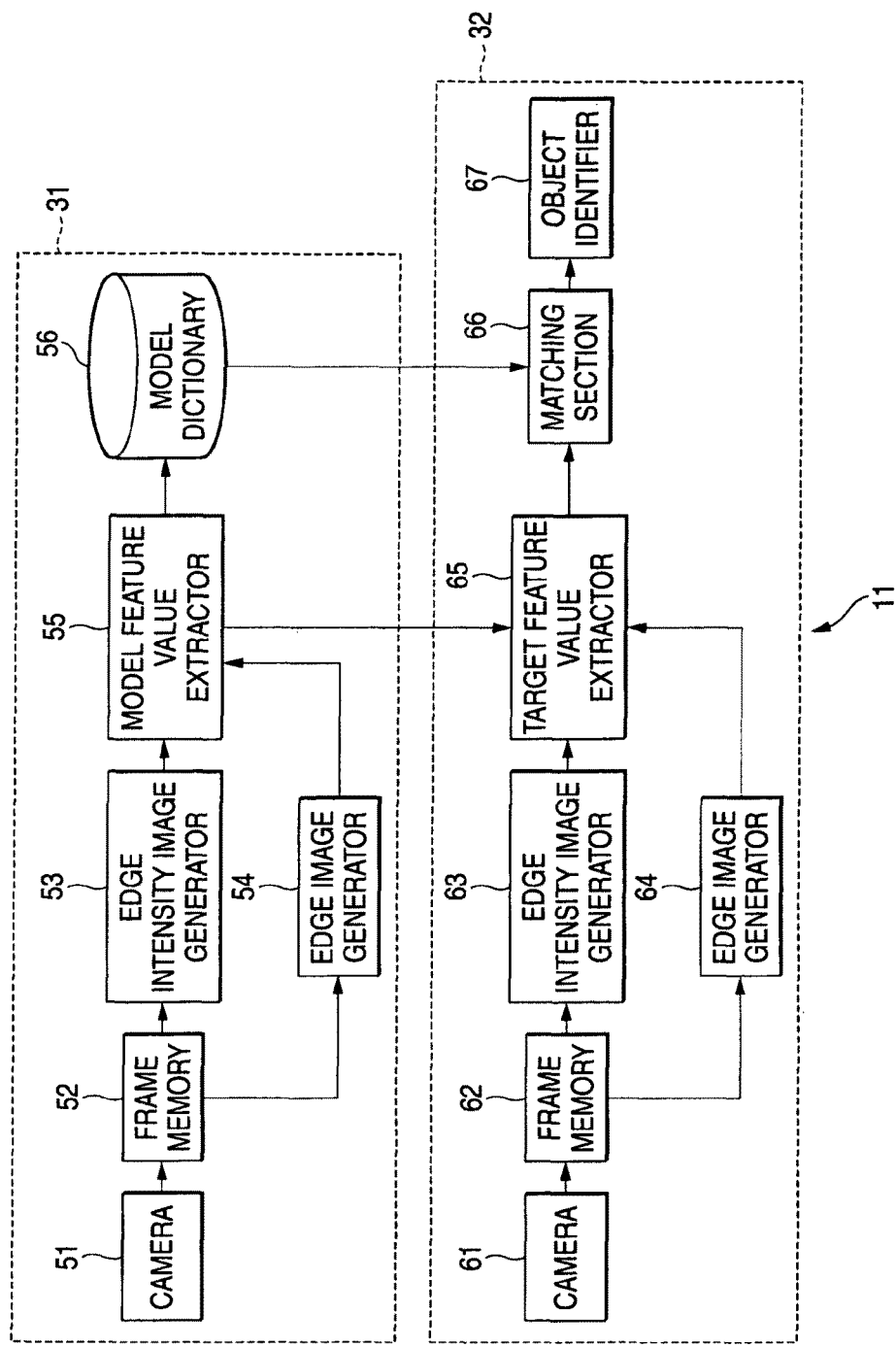
FIG. 1 is a block diagram showing the configuration of functional components of an object recognition apparatus, which is an embodiment of the invention.

FIG. 1 is a block diagram showing the configuration of functional components of an object recognition apparatus, which is an embodiment of the invention.

In FIG. 1, an object recognition apparatus 11 includes a model feature value registration unit 31 and a target image recognition unit 32.

In object recognition, the model feature value registration unit 31 generates an edge image from a model image, which is an image of an object to be recognized, extracts a model feature value, which is a local feature value at each edge point on the edge image, and registers the model feature value along with the geometric positional relationship among the edge points in a dictionary.

The model feature value registration unit 31 includes a camera 51, a frame memory 52, an edge intensity image generator 53, an edge image generator 54, a model feature value extractor 55, and a model dictionary 56.

The camera 51 includes an imaging device and an optical system, such as a lens, for focusing an image on the imaging device. The camera 51 captures an image of a subject and supplies the captured image to the frame memory 52. The captured image is either a still image or a motion image.

The frame memory 52 accumulates model images supplied from the camera 51. When the supplied image is a still image, the frame memory 52 stores the still image as it is. On the other hand, when the supplied image is a motion image, the frame memory 52 stores each frame of the motion image. The still image or the frame images of the motion image stored in the frame memory 52 are handled as a model image in the following processes.

The edge intensity image generator 53 generates an edge intensity image based on any of the model images accumulated in the frame memory 52. An edge intensity image is formed of edge intensities, each representing the degree of the magnitude of change in pixel value versus the change in position in a predetermined area of the model image. In an edge intensity image, the more abrupt and greater the change in pixel value, the higher the edge intensity, whereas the slower and smaller the change in pixel value, the lower the edge intensity. That is, the edge intensity image generator 53 generates an edge intensity image formed of edge intensities, each representing the degree of the magnitude of change in pixel value versus the change in position in the neighborhood of a pixel of interest in the model image. The edge intensity image generator 53 supplies the generated edge intensity image to the model feature value extractor 55.

The edge image generator 54 generates an edge image based on any of the model images accumulated in the frame memory 52. An edge image represents the boundary between pixels having greater pixel values and pixels having smaller pixel values in the model image. For example, the edge image generator 54 generates an edge image obtained by assigning a value of one to a pixel of interest in the model image when the pixel value thereof is greater than or equal to a predetermined threshold value, otherwise assigning a value of zero. The edge image generator 54 supplies the generated edge image to the model feature value extractor 55.

The model feature value extractor 55 determines sampling points in a local area on the edge image supplied from the edge image generator 54, each of the sampling points provided to extract a feature value. The model feature value extractor 55 also determines the geometric positional relationship between a base point, which is a reference point among the sampling points, and each of support points, which are sampling points other than the base point and determined dependent on the base point. The geometric positional relationship used herein is defined in such a way that one of two points of interest is assigned as the reference and the other point is expressed by the distance and angle from the reference point. That is, the model feature value extractor 55 determines the position of each support point relative to the base point.

The sampling point for extracting a feature value is an edge point where the edge image intersects a reference circle set in a local area on the edge image. The base point is one of the edge points on the reference circle, and the other points are support points. Using the geometric positional relationship between the base point and each of the support points, the position of each of the support points is expressed by the distance and angle from the base point.

Figure 2:
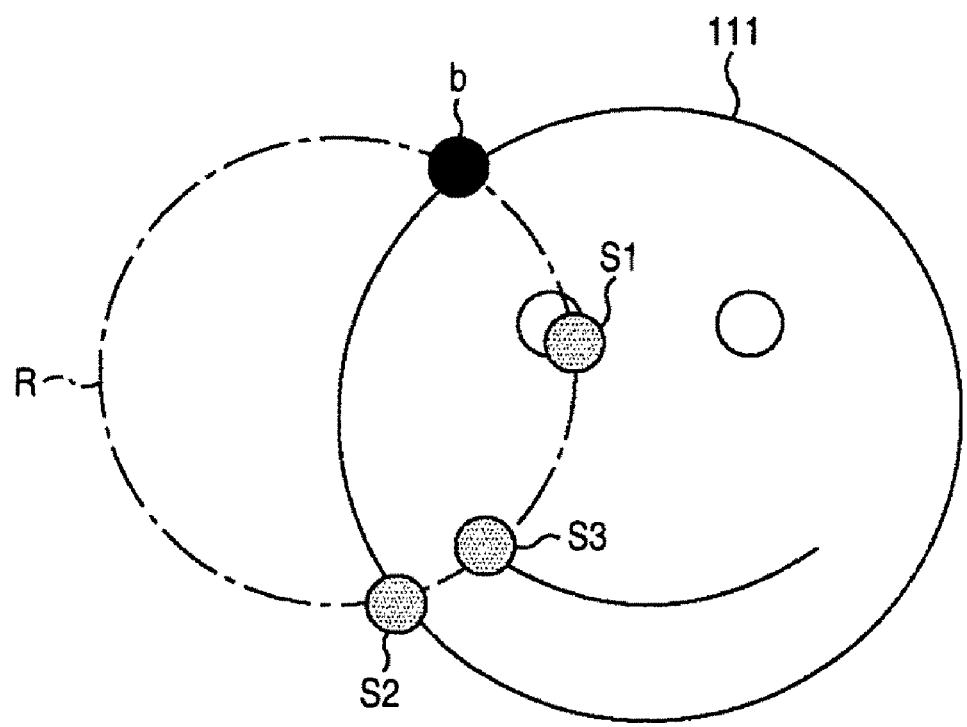
FIG. 2 explains a base point and support points determined by a model feature value extractor.

More specifically, as shown in FIG. 2, the model feature value extractor 55 determines a reference circle R as a local area in an edge image 111 generated by the edge image generator 54, and assigns edge points where the edge image 111 intersects the reference circle R as a base point b and support points s1, s2, and s3.

Figure 3:
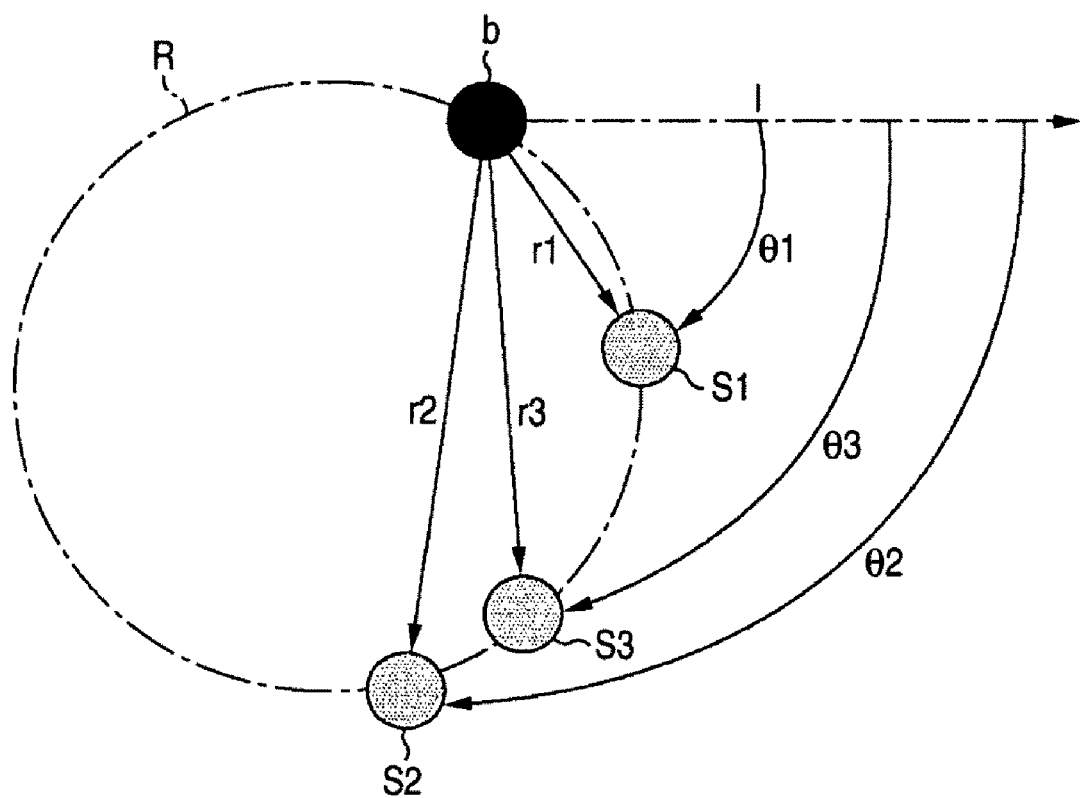
FIG. 3 explains the geometric positional relationship between the base point and each of the support points.

As shown in FIG. 3, in the model feature value extractor 55, the positions (distance and angle) of the support points s1 to s3, determined as shown in FIG. 2, relative to the base point b are expressed by relative distances r1, r2, and r3 and relative angles θ1, θ2, and θ3 measured from an reference axis I.

The model feature value extractor 55 sets a plurality of feature value extraction areas in the neighborhood of each of the thus determined base point and support points, and extracts the edge intensity in each of the feature value extraction areas as the model feature value, which is the feature value of the model image, based on the edge intensity image supplied from the edge intensity image generator 53.

The extracted model feature value of the model image is not expressed by binary values, zero and one, obtained from the edge image, but has successive values for each pixel in the neighborhood of an edge, like the edge intensity described above. That is, the model feature value is not limited to the edge intensity, but may be anything obtained by image processing and representing change in the neighborhood of an edge of the model image. For example, the model feature value is brightness that changes with the pixel position. More specifically, the model feature value is, for example, extracted by carrying out an operation on the model image, such as an operation using a differential filter, including a Gabor filter and a Gaussian differential filter.

Further, the model feature value extractor 55 supplies (registers) the geometric positional relationship between the base points and each of the support points as well as the model feature values extracted from the feature value extraction areas for each of the points for each model image to the model dictionary 56.

The model dictionary 56 is formed of, for example, a storage device, such as a hard disk drive, and a storage medium, such as a hard disk and a RAM (Random Access Memory). The model dictionary 56 stores the geometric positional relationship between the base point and each of the support points as well as the model feature values for each of the points supplied from the model feature value extractor 55 in such a way that these model feature values are related to the geometric positional relationship.

As described above, the model feature value registration unit 31 can describe a local area of a model image by using the feature value of the point of interest (base point b), the feature values of the surrounding points (support points s1 to s3), and the positional relationship between the point of interest and the surrounding points (relative distances r1 to r3 and relative angles θ1 to θ3).

Returning back to the description of FIG. 1, the target image recognition unit 32 will now be described. The target image recognition unit 32 generates an edge image from a target image to be recognized by comparing it with the object contained in any of the model images, and extracts a target feature value, which is a local feature value at each edge point on the generated edge image. The target image recognition unit 32 checks if the extracted target feature value matches any of the model feature values registered in the model dictionary 56 in the model feature value registration unit 31 so as to acquire a matching pair between the model image and the target image. The target image recognition unit 32 identifies the object in the target image with the object in the model image based on the number of acquired matching pairs.

The target image is a still image as it is or frame images of a motion image, as in a model image.

The target image recognition unit 32 includes a camera 61, a frame memory 62, an edge intensity image generator 63, an edge image generator 64, a target feature value extractor 65, a matching section 66, and an object identifier 67.

The description of the camera 61, the frame memory 62, the edge intensity image generator 63, and the edge image generator 64 is omitted because they have the same configurations as those of the camera 51, the frame memory 52, the edge intensity image generator 53, and the edge image generator 54 in the model feature value registration unit 31 described above.

Based on the edge image and the edge intensity image of a target image, the target feature value extractor 65 extracts, as the target feature value, which is the feature value of the target image, the edge intensity at each of the edge points in the target image that correspond to the base point and the support points in the model image. The target feature value extractor 65 supplies the extracted target feature values of the target image to the matching section 66.

The extracted target feature value is not expressed by binary values, zero and one, obtained from the edge image, but has successive values for each pixel in the neighborhood of an edge. That is, the target feature value is not limited to the edge intensity, but may be anything obtained by image processing and representing change in the neighborhood of an edge of the target image. For example, the target feature value is brightness that changes with the pixel position. More specifically, the target feature value is, for example, extracted by carrying out an operation on the target image, such as an operation using a differential filter, including a Gabor filter and a Gaussian differential filter.

By thus not using the edge information expressed by binary values of zero and one, but using a value that changes with the pixel position for the target feature value and the model feature value, it is possible to reduce the influence of any error produced in extracting the feature values on the comparison between the target feature value and the model feature value.

The matching section 66 checks if each of the target feature values of the target image that are extracted in the target feature value extractor 65 matches any of the model feature values of the model image that are registered in the model dictionary 56 so as to acquire a matching pair between the model image and the target image. More specifically, the matching section 66 checks if the target feature value, extracted in the target feature value extractor 65, at each of the points that are on an edge of the target image and correspond to the base point and the support points in the model image matches any of a plurality of model feature values at the base point and the support points in the model image.

The object identifier 67 identifies the object contained in the target image based on the number of matching pairs acquired in the matching section 66. More specifically, the object identifier 67 identifies the subject of the target image with the subject of the model image when the number of matching pairs, which is the result of the matching between each of the target feature values and a plurality of model feature values, is greater than a predetermined value.

By using the configuration described above to check if the feature values of the target image match the feature values of the model image so as to identify the object contained in the target image with the object contained in the model image, the target image recognition unit 32 can recognize the object in the image.

The process for registering feature values of a model image performed in the object recognition apparatus 11 will be described.

For example, when the camera 51 images a predetermined object and the edge intensity image generator 53 and the edge image generator 54 acquire the image recorded in the frame memory 52, the model feature value registration unit 31 starts the process for registering feature values of a model image.

FIG. 4 is a flowchart for explaining the process for registering feature values of a model image performed in the model feature value registration unit 31 in the object recognition apparatus 11.

In the step S11, the model image acquired from the frame memory 52 undergoes the process for generating an edge intensity image in the edge intensity image generator 53.

Figure 5:
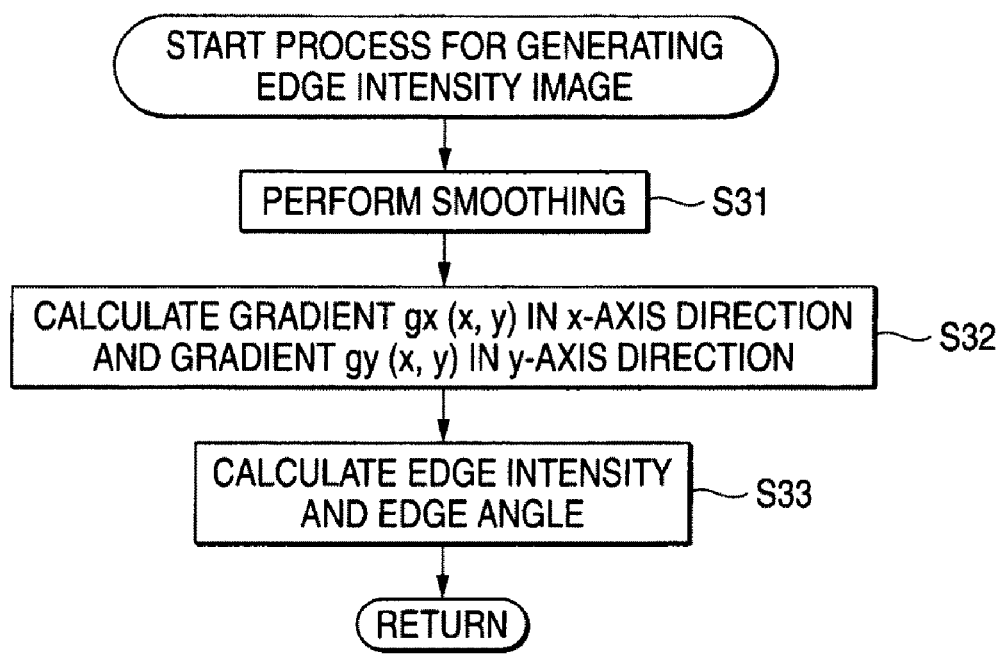
FIG. 5 is a flowchart for explaining the details of the process for generating an edge intensity image.

FIG. 5 is a flowchart for explaining the details of the process for generating an edge intensity image.

The following description shows a method for generating an edge image from a grayscale image. Among various edge extraction methods, a Canny-edge filter is particularly known in terms of stability and accuracy, and will be used herein in the edge extraction process. A Canny-edge filter is described in detail in a non-patent document, J. R. Parker, "Algorithms for Image Processing and Computer Vision", John Wiley & Sons, Inc.

In the step S31, the edge intensity image generator 53 carries out smoothing. That is, the edge intensity image generator 53 applies a Gaussian filter G(x, y) to an image f(x, y) to reduce noise and fine texture in the image. More specifically, the edge intensity image generator 53 carries out convolution between the Gaussian filter G(x, y) and the image f(x, y) to provide a smoothed image g(x, y) as expressed by the equation (1). The Gaussian filter G(x, y) is expressed by the equation (2).

$$g(x, y) = G(x, y) * f(x, y) \quad (1)$$

$$G(x, y) = \frac{1}{\sqrt{2\pi\sigma^2}} \exp\left[-\frac{x^2 + y^2}{2\sigma^2}\right] \quad (2)$$

Figure 6:
FIG. 6 shows a differential filter used in the process for generating of an edge intensity image.

In the step S32, the edge intensity image generator 53 calculates the gradient gx(x, y) in the x-axis direction and the gradient gy(x, y) in the y-axis direction. More specifically, the edge intensity image generator 53 applies the differential filter shown in FIG. 6 to the smoothed image g(x, y) obtained in the step S31 to create a gradient image expressed by the gradient in the x-axis direction and the gradient in the y-axis direction. That is, the x-direction filter shown on the left of FIG. 6 is applied to create the gradient gx(x, y) in the x-axis direction, and the y-direction filter shown on the right of FIG. 6 is applied to create the gradient gy(x, y) in the y-axis direction.

In the step S33, the edge intensity image generator 53 calculates edge intensities and edge angles. The edge intensity image generator 53 uses the gradient images gx(x, y) and gy(x, y) created in the step S32 to generate an edge intensity image M(x, y) expressed by the equation (3) and an edge angle image θ(x, y) expressed by the equation (4).

$$M(x, y) = \sqrt{gx(x, y)^2 + gy(x, y)^2} \quad (3)$$

$$\theta(x, y) = \tan^{-1}\left[\frac{gy(x, y)}{gx(x, y)}\right] \quad (4)$$

The edge intensity image generator 53 thus generates an edge intensity image.

Returning back to the description of the flowchart in FIG. 4, in the step S12, the model image acquired from the frame memory 52 undergoes the process for generating an edge image in the edge image generator 54.

Figure 7:
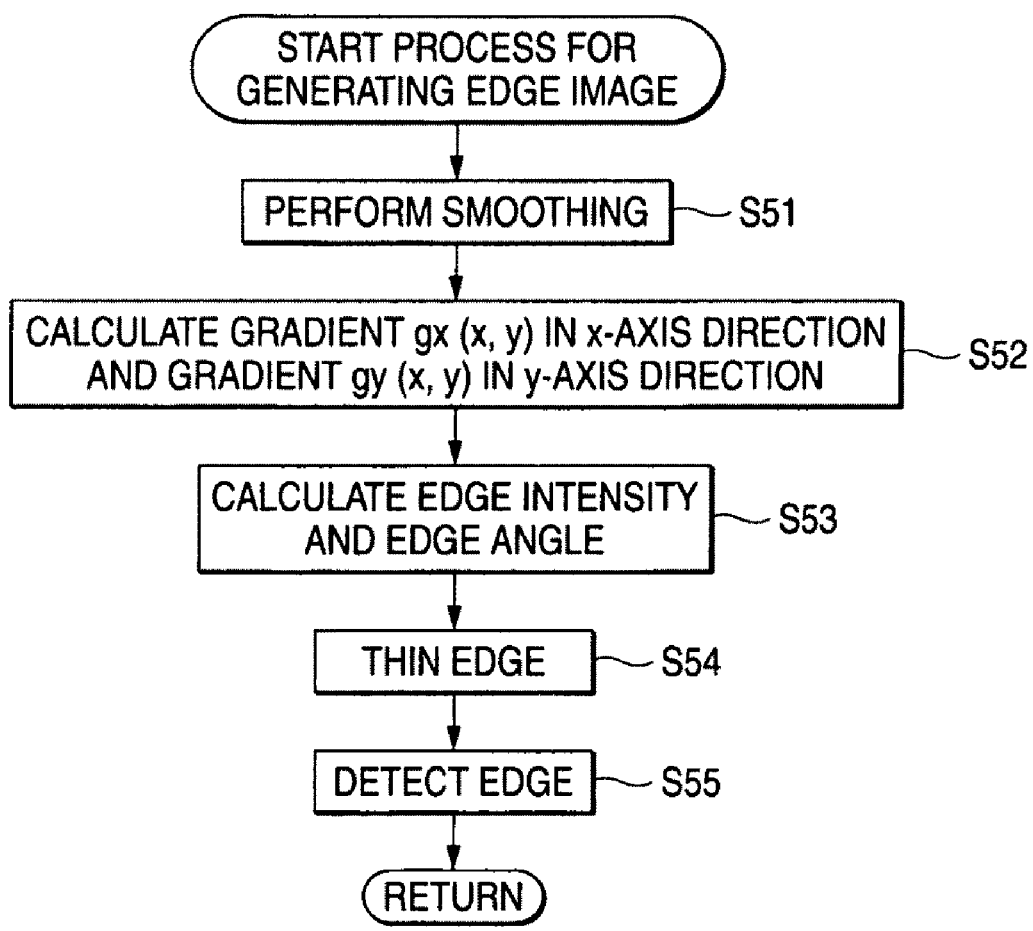
FIG. 7 is a flowchart for explaining the details of the process for generating an edge image.

FIG. 7 is a flowchart for explaining the details of the process for generating an edge image.

In the flowchart in FIG. 7, the processes in the steps S51 to S53 executed by the edge image generator 54 are the same as the processes in the steps S31 to S33 executed by the edge intensity image generator 53 in the flowchart in FIG. 5. The description of the processes in the steps S51 to S53 is thus omitted.

In the step 54, the edge image generator 54 carries out edge-thinning. That is, the width of the edge of the edge intensity image M(x, y) generated in the step S53 ranges from one pixel to a several pixels. The edge image generator 54 thins such a width into the one-pixel width. More specifically, when the edge intensity image M(x, y) is not zero at a predetermined point (x, y), the edge image generator 54 compares the value of the edge intensity image M(x, y) at that point with the value of the edge intensity image M(x, y) at the point (x1, y1) located in the edge direction expressed by the edge angle image θ(x, y) of the point (x, y) and the value of the edge intensity image M(x2, y2) at the point (x2, y2) in the edge direction on the opposite side to the point (x1, y1). When the edge intensity image M(x, y) at the point (x, y) is smaller than the edge intensity image M(x1, y1) or the edge intensity image M(x2, y2), the edge image generator 54 judges that the point (x, y) is not an edge point and sets the edge intensity image M(x, y) to zero.

In the step S55, the edge image generator 54 detects the edge. That is, the edge intensity image M(x, y) thinned in the step S54 undergoes a thresholding process in the edge image generator 54 so that an edge image is generated. When a Canny-edge filter is used, two threshold values T_high and T_low are used in the thresholding process. More specifically, when the edge intensity image M(x, y) at the point (x, y) is greater than T_high, the edge image generator 54 sets that point as the start point, sequentially searches a point where the edge intensity image M(x, y) is greater than or equal to T_low, and sets that point as the edge point.

The parameters in the Canny-edge filter described above are the degree of smoothing a used in the step S51 (or the step S31) and the two threshold values T_high and T_low for edge detection used in the step S55. Setting these parameters to appropriate values in advance allows more accurate edge detection.

Returning back to the description of the flowchart in FIG. 4, in the step S13, the model feature value extractor 55 carries out the process for determining a reference circle.

The contour of an object locally varies. To use geometric constraint defined by the relative distance and the relative angle described above, the size (radius) of the reference circle is set according to the contour of the object, that is, the edge image, contained in each local area. The geometric constraint used herein means keeping the geometric positional relationship between the base point and each of the support points described above. It can be said that the more support points per base point, the stronger the geometric constraint.

Figure 8A:
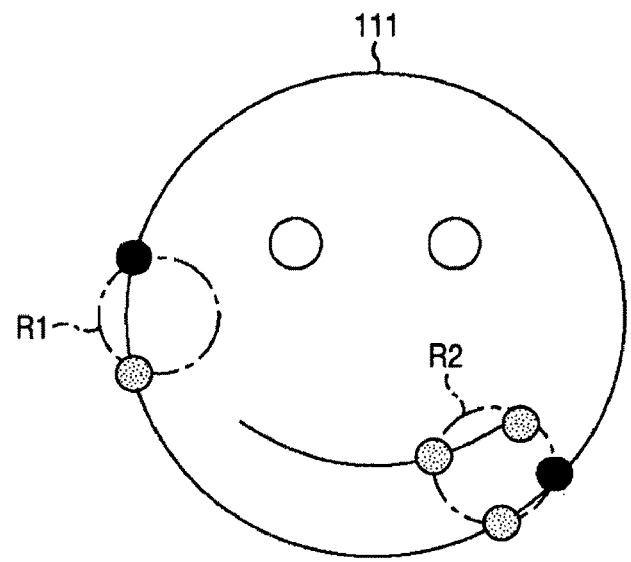
FIGS. 8A and 8B are views explaining geometric constraint in a reference circle.
Figure 8B:
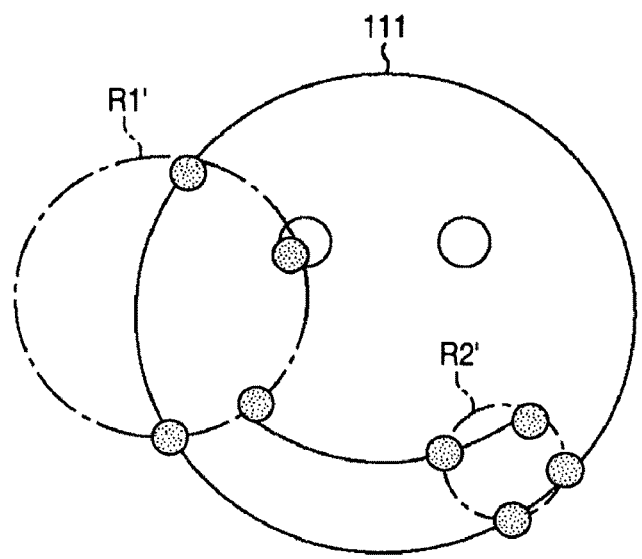

More specifically, for example, as shown in FIG. 8A, when the radius of each reference circle is fixed, geometric constraint will not be sufficient in the area of the reference circle R1. On the other hand, sufficient geometric constraint can be obtained by increasing the radius of the reference circle R1, like the area of the reference circle R1' shown in FIG. 8B. That is, the reference circle R1' provides two more edge points. Depending on the contour of an object, sufficient geometric constraint may be obtained with a reference circle having a smaller radius.

Therefore, the radius of the reference circle is determined in such a way that there are an adequate number of edge points where the reference circle intersects the edge image.

To determine such a reference circle R, it is necessary to determine a center pixel that becomes the center of the reference circle R and the radius thereof. To extract areas by which sufficient geometric constraint is obtained around the circumference of the reference circle R, the degree of how widely the edge points in the neighborhood of the contour of the reference circle R are scattered across the reference circle R is used as an evaluation parameter.

Figure 9:
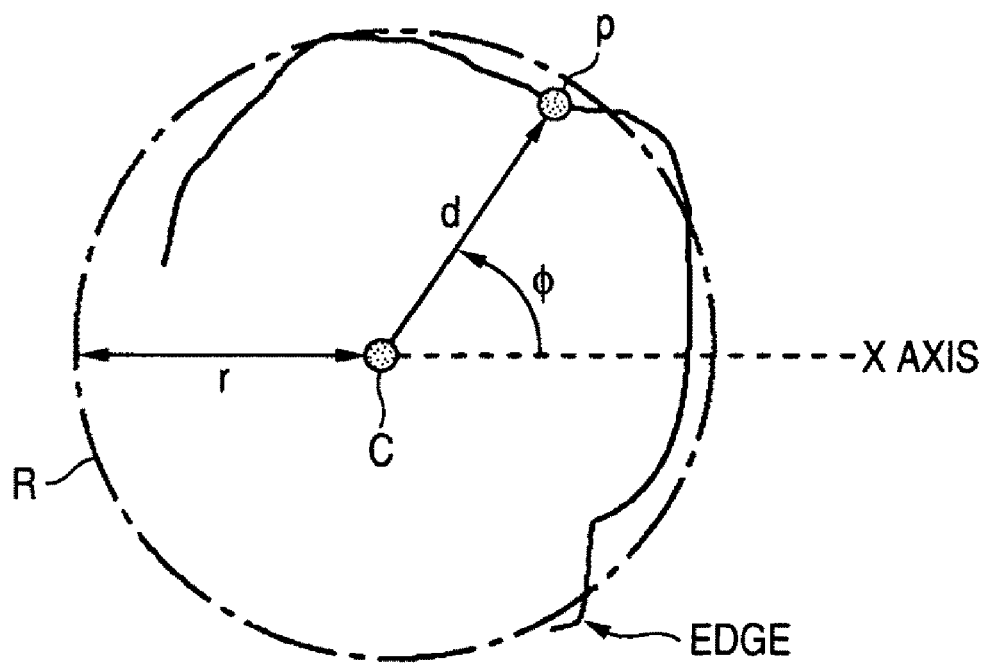
FIG. 9 explains evaluation of how widely edge points are scattered across a reference circle.

That is, the evaluation of how widely the edge points are scattered is expressed by the equations (5) and (6) using the radius r of the reference circle R, the center c of the reference circle R, the distance d from the center c to each edge point p, and the angle $\phi$ of each edge point p measured from the x axis, as shown in FIG. 9.

$$H(c, r) = \sum_k h(k, c, r) \log h(k, c, r) \qquad (5)$$

$$h(k, c, r) = \frac{1}{\sum_p \|d_p - r\|} \sum_p \|d_p - r\| K\left(k - \frac{M}{2\pi}\phi_p\right) \qquad (6)$$

In this evaluation, the reference circle R is divided into L steps, and the value k ranges from 1 to L.

In the equation (6), K(x) denotes a smoothing kernel and is expressed by the equation (7):

$$K(x) = \exp\left(\frac{-x^2}{2}\right) \qquad (7)$$

The entropy value H(c, r) becomes larger as the degree of how widely the edge points in the neighborhood of the reference circle R are scattered across the reference circle R becomes larger. That is, a large entropy value means that the reference circle R contains a sufficient number of edge points.

More specifically, the model feature value extractor 55 gradually increases the radius of the reference circle R around a non-edge point. Every time increasing the radius of the reference circle R, the model feature value extractor 55 evaluates the entropy value and stores the radius that gives the largest entropy value. The model feature value extractor 55 determines the radius that gives the largest entropy value for all points. This procedure determines a reference circle having a center and a radius that give a larger entropy value, that is, a reference circle containing more edge points.

Figure 10:
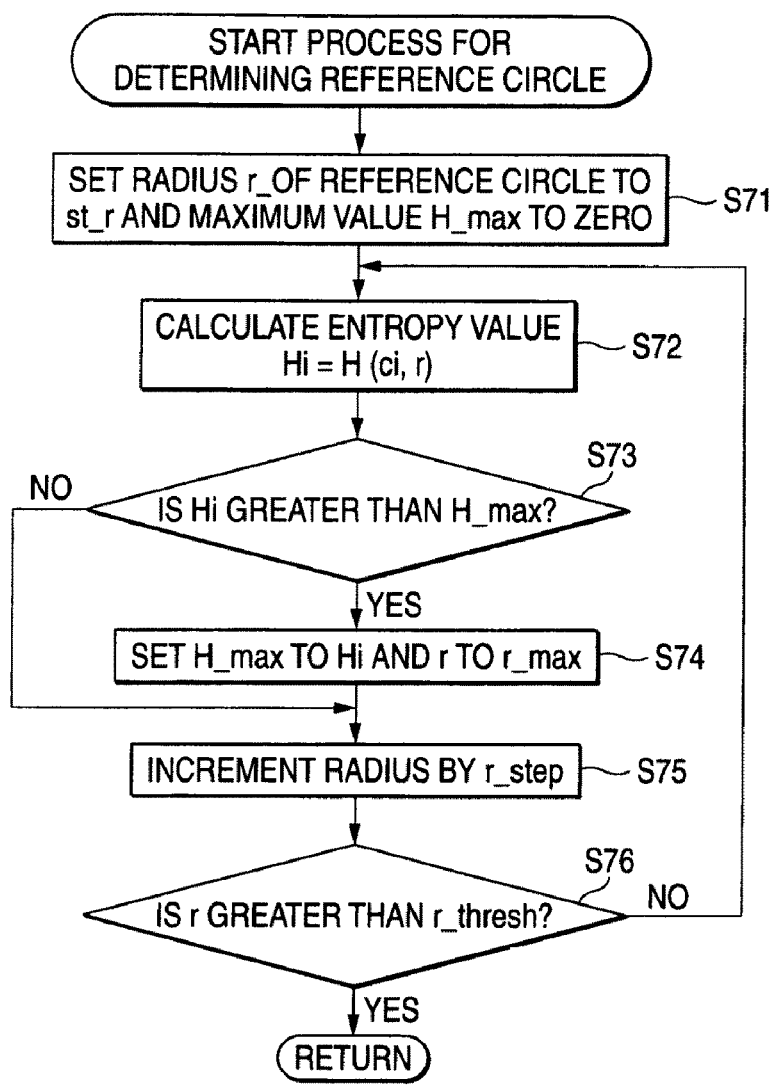
FIG. 10 is a flowchart for explaining the process for determining a reference circle.

FIG. 10 is a flowchart for explaining the process for using the indices described above to determine a reference circle having its center at an arbitrary point ci on the model image.

In the step S71, the model feature value extractor 55 sets the radius r of the reference circle to the smallest radius st_r of the reference circle set in advance, and the maximum value H_max to zero. The maximum value H_max represents the largest entropy value that changes as the radius of the reference circle at the arbitrary point ci changes.

In the step S72, the model feature value extractor 55 uses the equation (5) to calculate the entropy value Hi=H(ci, r) of the reference circle having its center at the arbitrary point ci for the current radius of the reference circle.

In the step S73, the model feature value extractor 55 judges whether or not the calculated entropy value Hi is greater than the maximum value H_max. When the model feature value extractor 55 judges that the entropy value Hi is greater than the maximum value H_max, the next process in the step S74 is carried out.

In the step S74, the model feature value extractor 55 sets the maximum value H_max to the entropy value Hi, and sets the radius r to the radius r_max of the reference circle that gives the largest entropy value. After the step S74, the process in the step S75 is carried out.

On the other hand, in the step S73, when the model feature value extractor 55 judges that the entropy value Hi is smaller than or equal to the maximum entropy value H_max, the step S74 is skipped and the process in the step S75 is carried out.

In the step S75, the model feature value extractor 55 increments the radius r by a radius update step r_step set in advance.

In the step S76, the model feature value extractor 55 judges whether or not the radius r is greater than a predetermined threshold value r_thresh. When the model feature value extractor 55 judges that the radius r is greater than the threshold value r_thresh, the process is terminated.

On the other hand, when the model feature value extractor 55 judges that the radius r is smaller than or equal to the threshold value r_thresh, the process returns to the step S72 and repeats the processes in the step 72 and the following steps.

The model feature value extractor 55 thus calculates the radius and the entropy value of the reference circle having its center at the arbitrary point ci by successively incrementing the radius by the radius update step set in advance, and stores the maximum entropy value H_max and the radius r_max of the reference circle that gives the maximum entropy value H_max.

Figure 11:
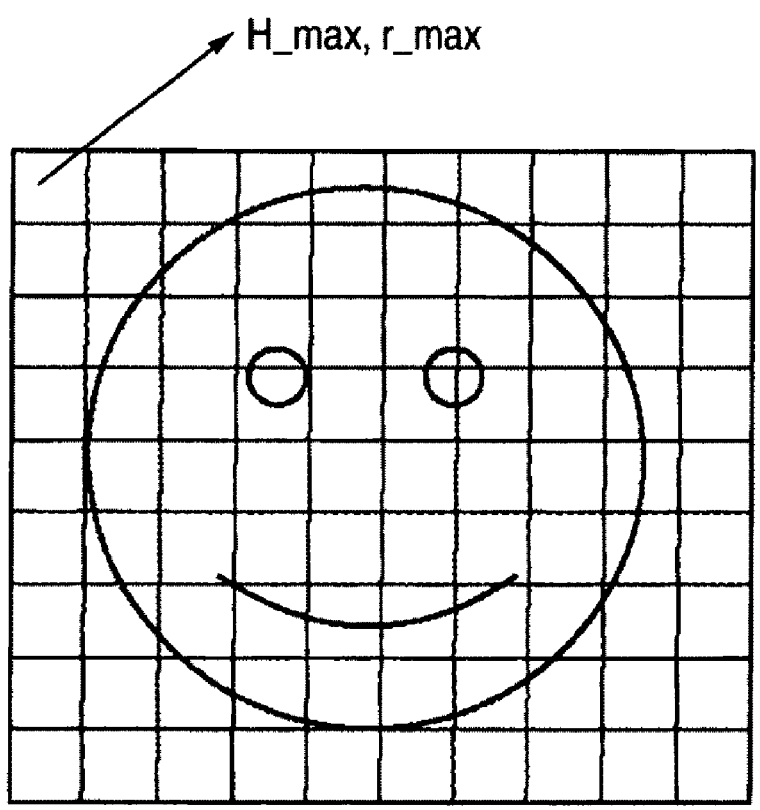
FIG. 11 shows an entropy map.

That is, the model feature value extractor 55 carries out the above processes for all the points on the model image to obtain an entropy map E_Map shown in FIG. 11 that stores the maximum entropy value H_max and the radius r_max of the reference circle for each pixel.

After the reference circles for all the points have thus been determined, the model feature value extractor 55 uses the entropy values in the entropy map E_Map to carry out non-maximum suppression as the process for determining the final reference circle. That is, when a pixel of interest does not have a local maximum value, the model feature value extractor 55 sets the entropy values and the radius values in the neighborhood of the pixel of interest (eight neighbors, sixteen neighbors or the like) held in the entropy map E_Map to zero.

Then, the model feature value extractor 55 carries out binarization by using a minimum entropy value set in advance to create the final entropy map E_Map. The entropy map E_Map has the same size as that of the model image, and each pixel holds the entropy value and the radius of the circle associated with that pixel. The reference circle Ri (i is an integer ranging from 1 to n) is thus determined, the center of which being the position of a pixel having a non-zero entropy value.

Returning back to the description of the flowchart in FIG. 4, in the step S14, the model feature value extractor 55 determines the base point and support points.

More specifically, the model feature value extractor 55 uses the reference circle Ri and the edge image to determine the base point bi and the support points sij (j is an integer greater than or equal to 1). Selection of the reference circle is made in descending order of the entropy values in the entropy map E_Map.

Figure 12:
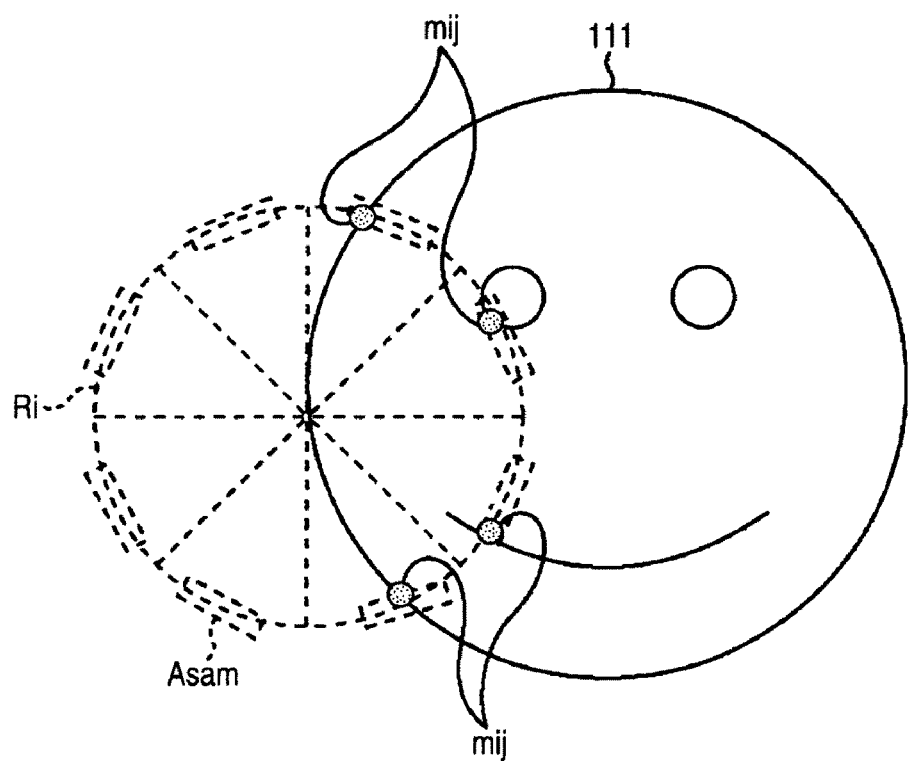
FIG. 12 explains how to sample sampling points.

FIG. 12 explains how to sample sampling points, which are the base point and the support points.

In the sampling of the base point and the support points, the model feature value extractor 55 divides the reference circle Ri into m portions in the angular direction, as shown in FIG. 12. The number of division m changes according to the radius of the reference circle Ri (for example, when the radius of the reference circle Ri is large, the number of division m is large, whereas when the radius of the reference circle Ri is small, the number of division m is small).

Further, the model feature value extractor 55 sets a sampling area in each of the divided areas. More specifically, for example, the model feature value extractor 55 sets a sampling area Asam that is a rectangular area having its longer side in the tangential direction of the arc, the sampling area Asam set in such a way that it contains approximately the center portion of the divided arc, as shown in FIG. 12. The point closest to the edge image 111 among the points in the sampling area Asam is assigned as the sampling point mij (j is an integer that is at least 1 but smaller than or equal to m).

Then, the model feature value extractor 55 determines the base point among a plurality of sampling points. For example, the model feature value extractor 55 assigns the point having the smallest x coordinate among the plurality sampling points as the base point. In the invention, the shape of an object is described by a set of base points, so that the base points desirably spread across the edge image. To this end, a new base point is determined by referring to, as the history, the positions already determined as the base point. That is, the model feature value extractor 55 refers to the history formed of the positions of the preceding base points, selects a point (pixel) from the sampling points mij in such a way that the point to be selected is outside the neighborhood of the preceding base point pixels, and assigns such a point (pixel) as a new base point and the other points (pixels) as the support points. The history of the positions of the base points is updated whenever a new base point is determined.

In the step S15, the model feature value extractor 55 determines the relative angle θij and the relative distance rij of each of the support points. More specifically, the model feature value extractor 55 uses the determined base point bi and the reference axis direction thereof (zero-degree direction) to determine the position of each of the support points sij relative to the base point bi.

Figure 13A:
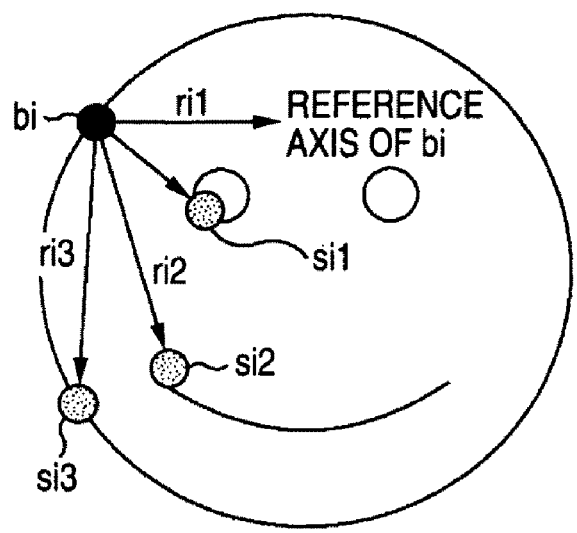
FIGS. 13A and 13B show the positions of support points relative to a base point.
Figure 13B:
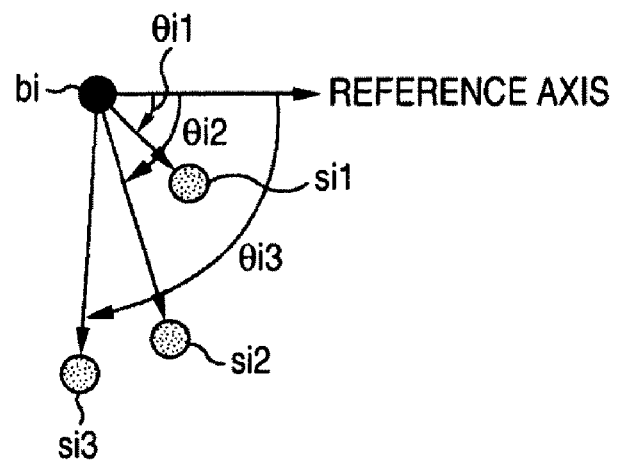

FIGS. 13A and 13B show the positions of the support points sij relative to the base point bi.

In FIG. 13A, the base point bi and its support points si1 to si3 are set on the edge image 111. As shown in FIG. 13A, the model feature value extractor 55 determines the distance ri1 of the support point si1 relative to the base point bi, the distance ri2 of the support point si2 relative to the base point bi, and the distance ri3 of the support point si3 relative to the base point bi.

As shown in FIG. 13B, the model feature value extractor 55 determines the angle θi1 of the support point si1 relative to the reference axis of the base point bi, the angle θi2 of the support point si2 relative to the reference axis of the base point bi, and the angle θi3 of the support point si3 relative to the reference axis of the base point bi.

In the step S16, the model feature value extractor 55 extracts a model feature value from each of a plurality of feature value extraction areas set in the neighborhood of the base point bi and the support points sij based on the reference circle Ri. At this point, the process is completed. More specifically, the model feature value extractor 55 provides a plurality of feature value extraction areas in the neighborhood of the sampling points (the base point and the support points) with reference to the line connecting the center of the reference circle Ri to each of the sampling points so as to extract a model feature value in that feature value extraction area.

Figure 14:
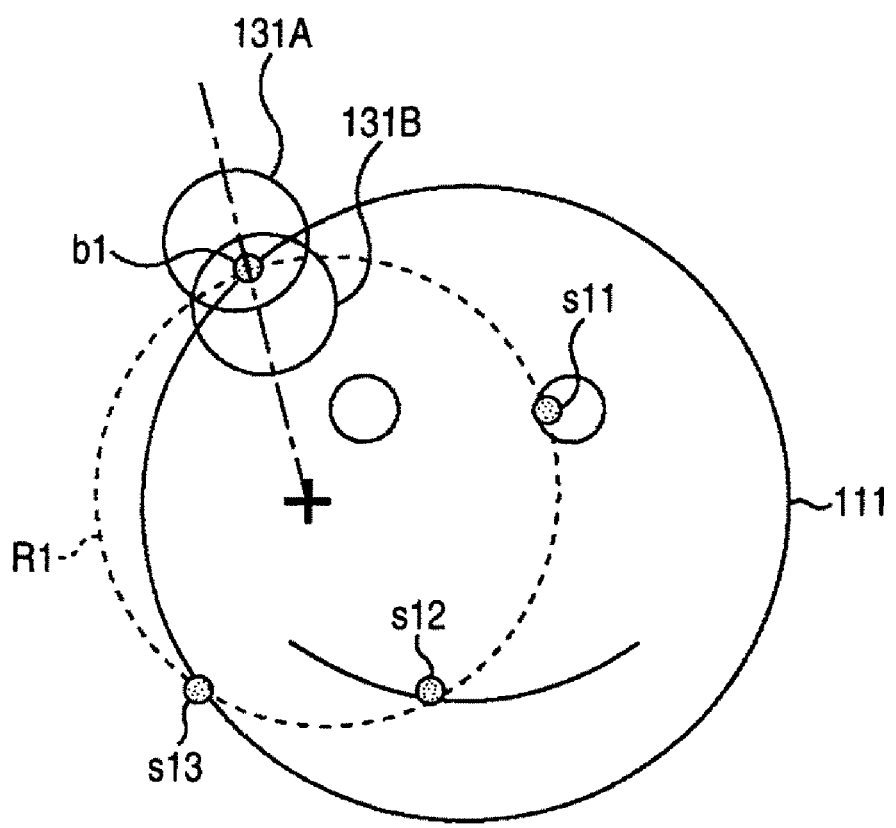
FIG. 14 explains how to set feature value extraction areas.

FIG. 14 explains how to set the feature value extraction areas for the reference circle R1. As shown in FIG. 14, two feature value extraction areas 131A and 131B are set on the line connecting the center of the reference circle R1 to the base point b1, which is one of the sampling points on the reference circle R1. The feature value extraction areas 131A and 131B are set inside and outside the reference circle R1 with reference to the base point b1.

In this way, the model feature value extractor 55 can extract two model feature values for one sampling point (the base point or any of the support points).

The feature value extraction areas to be set are not limited to these two inside and outside the reference circle R1 as describe above, but a plurality of feature value extraction areas may be set in the neighborhood of each of the sampling points. Each of the sampling points can thus have a plurality of feature values.

In general, for a less-textured object, the base point and the support points determined in the step S14 are often located in the contour portion of the object. In this case, when the target image contains a complicated background, the feature value extracted from an area around each sampling point is affected by the background noise, and hence it is difficult to check if a feature value matches another.

To address this problem, by assigning a plurality of feature values to one sampling point as described above, at least one of the plurality of model feature values is unlikely affected by the background noise, so that a feature value likely matches another even in the contour portion of the object when the target image contains a complicated background.

Figure 15:
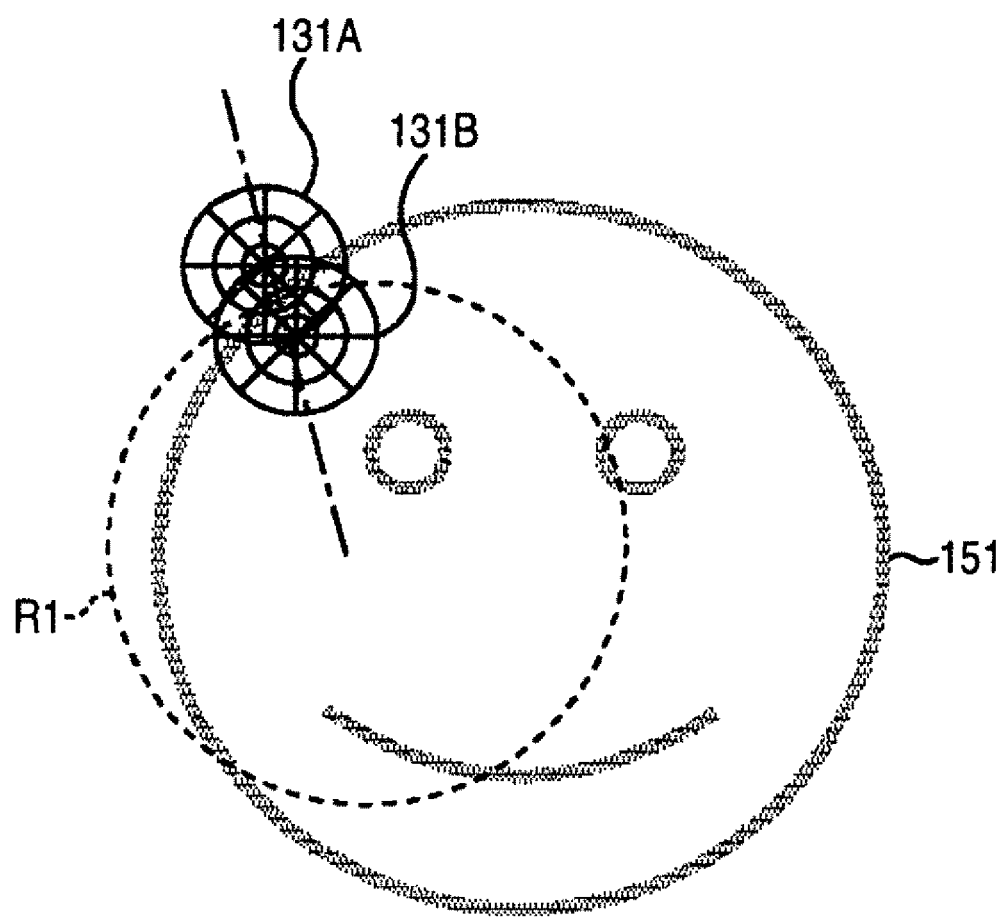
FIG. 15 explains how to extract feature values in feature value extraction areas.

It is noted that the model feature value in each of the thus determined feature value extraction areas is not obtained by sampling the edge image but the edge intensity image M generated in the step S11 and having successive values, for example, ranging from 0 to 255. FIG. 15 explains how to extract the feature values in the feature value extraction areas 131A and 131B by using an edge intensity image 151.

As shown in FIG. 15, in the edge intensity image 151, the feature value extraction areas 131A and 131B are set at the positions corresponding to the feature value extraction areas in the edge image 111 shown in FIG. 14. The feature value extraction areas 131A and 131B in FIG. 15 are formed of a plurality of concentric circles having different radii and surrounded by the outermost one. The concentric circles are radially segmented, each of the segmented portions having a predetermined angle.

The feature value extraction areas 131A and 131B are hereinafter simply referred to as feature value extraction areas 131 unless they need to be distinguished.

Figure 16:
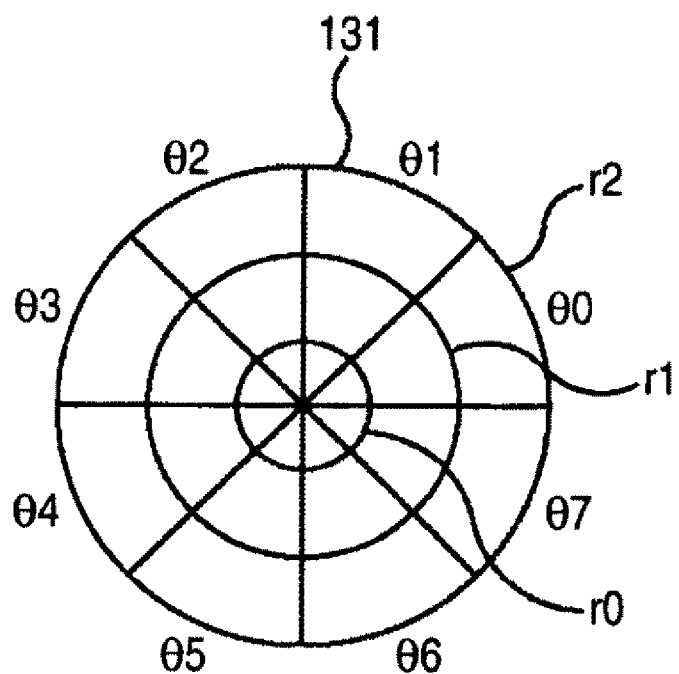
FIG. 16 explains how to divide the feature value extraction area 131.

FIG. 16 explains how to divide the feature value extraction area 131 set in FIG. 15.

As shown in FIG. 16, the feature value extraction area 131 includes three concentric circles having different radii and is divided into 24 smaller areas, three in the distance direction from the center of the concentric circles (r0 to r2) by eight in the angular direction (θ0 to θ7).

Figure 17:
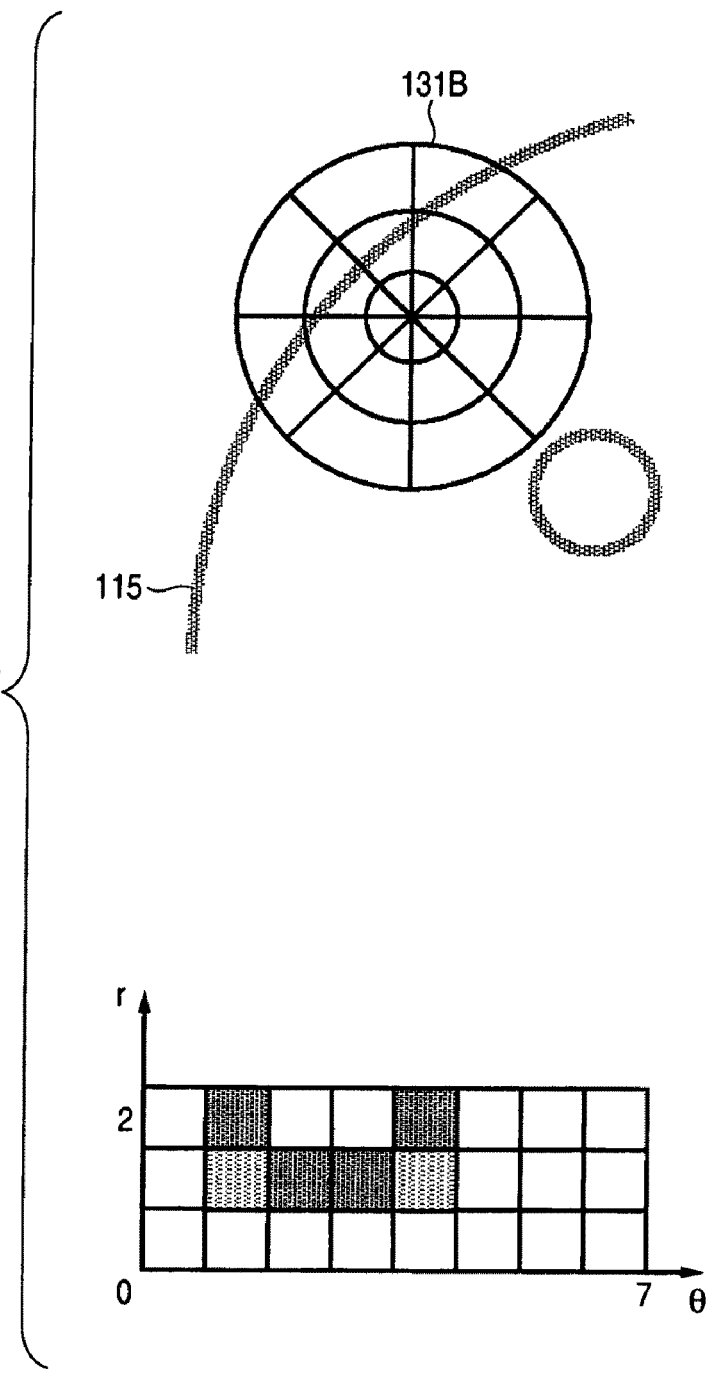
FIG. 17 explains the edge intensity in divided feature value extraction areas.

FIG. 17 explains the edge intensity in the feature value extraction area 131B divided as shown in FIG. 16.

As shown in FIG. 17, summing the edge intensities of the edge intensity image 151 for each of the areas obtained by dividing the feature value extraction area 131B provides a two-dimensional histogram for the distance and radius.

More specifically, since the edge intensities are high in the area at the distance r2 and the angle θ1, the area at the distance r1 and the angle θ2, the area at the distance r1 and the angle θ3, and the area at the distance r2 and the angle θ4, each containing a relatively large part of the contour of the edge intensity image 151 in FIG. 17, the portions in the two-dimensional histogram that correspond to the areas having high edge intensities are filled with high grayscales. Since the edge intensities are relatively high in the area at the distance r1 and the angle θ1 and the area at the distance r1 and the angle θ4, each containing a small part of the contour of the edge intensity image 151 in FIG. 17, the portions in the two-dimensional histogram that correspond to the areas having relatively high edge intensities are filled with low grayscales. Since the edge intensities are low in the areas containing no contour of the edge intensity image 151 in FIG. 17, the portions in the two-dimensional histogram that correspond to the areas having low edge intensities are open.

Such a histogram represents the edge intensity, which is the model feature value in each of the areas obtained by dividing the feature value extraction area. The feature value extraction area may be divided into any number of small areas other than the 24 smaller areas, three in the distance direction by eight in the angular direction, described above.

In general, since the process for extracting an edge includes binarization, it is significantly difficult to acquire edge images similar to each other for a model image and a target image, which is an input image. When the edge information at an edge point is directly used as the feature value, the feature value expressed by binary values, zero and one, will be greatly affected by edge extraction errors, and hence the target image will greatly differs from the model image.

To address this problem, by using edge intensity information having successive values ranging from 0 to 255 instead of the edge information at an edge point expressed by binary values of zero and one as described above, the shift in feature value caused by edge extraction errors can be eliminated.

Further, by roughly dividing the feature value extraction area that has been set and summing the feature values in each of the divided areas, it is possible to handle the situation in which the appearance of the object changes as the brightness and the like changes and the situation in which the scale changes, for example, when the object is located at a near or far distance.

Therefore, when the number of support points is N and the number of feature values (the number of feature value extraction areas) is M for each base point, the following information is provided from a model image.

That is, one model image provides the position of the base point (bx, by), the relative positions of the feature value extraction areas (fbθi, fbri) for the base point, and the feature value bfi of the base point. In the above description, i is an integer ranging from 1 to M.

Similarly, one model image provides the relative positions of the support points (θj, rj) (j is an integer ranging from 1 to N), the relative positions of the feature value extraction areas (fsθi, fsri) for each of the support points, and the feature value sfi of each of the support points.

The position and the feature value of each of the feature value extraction areas for each of the thus provided base point and support points are registered in the model dictionary 56.

Next, a description will be made of how a target object is recognized in the object recognition apparatus 11. That is, a description will be made of a process for recognizing which model image includes an object that most resembles the object contained in the input target image among the objects contained in the model images registered in the model dictionary 56.

There are various methods for evaluating similarity. For example, according to one of them, consider edge points that are P feature points in a model image and the points in a target image that correspond to the P feature points. Calculate a cost between a pair of feature values corresponding to each other, and save the pair as a matching pair when the pair has a sufficiently high cost, and repeat this procedure for all the pairs of feature values. When the number of thus obtained matching pairs is sufficiently large, the object contained in the target image is identified with the object contained in the model image.

The process for acquiring a matching pair between a target image and a model image in the object recognition apparatus 11 will be described.

For example, when the camera 61 images an object to be recognized and the edge intensity image generator 63 and the edge image generator 64 acquire the target image recorded in the frame memory 62, the target image recognition unit 32 starts the process for acquiring a matching pair.

Figure 18:
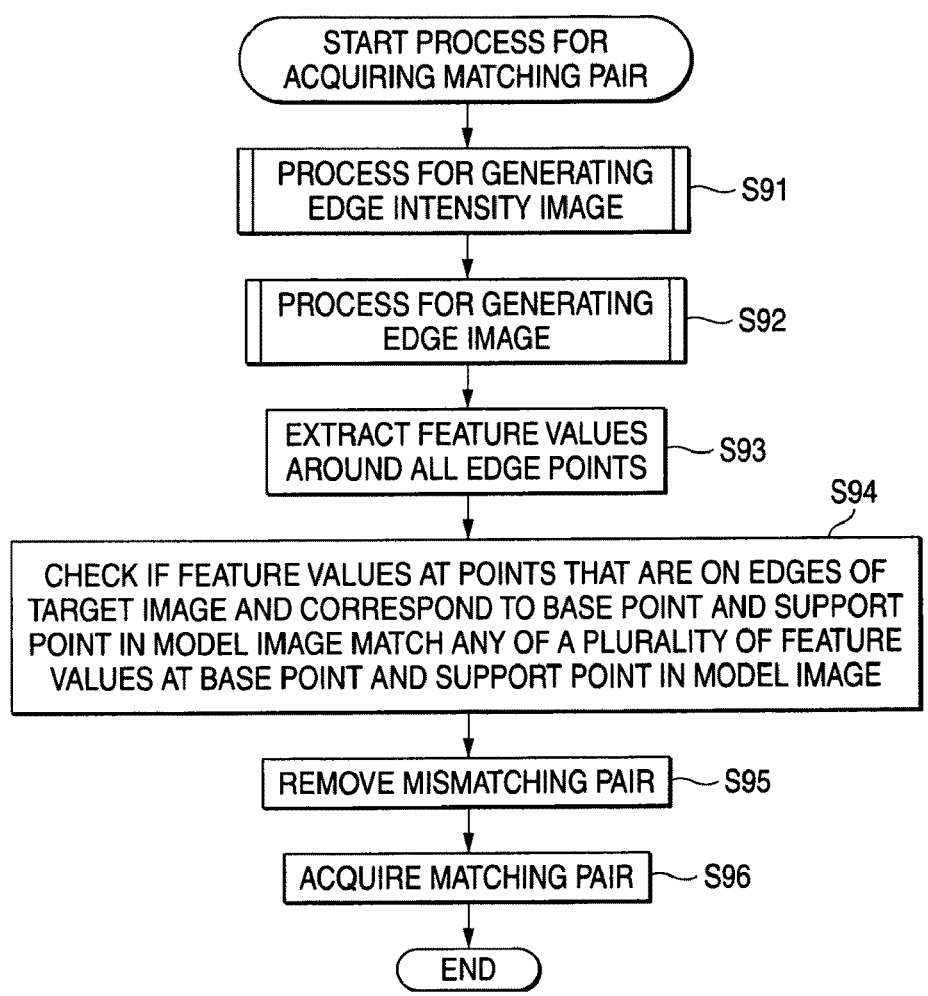
FIG. 18 is a flowchart for explaining the process for acquiring a matching pair between a target image and a model image.

FIG. 18 is a flowchart for explaining the process for acquiring a matching pair between a target image and a model image in the target image recognition unit 32 in the object recognition apparatus 11.

The description of the process in the step S91 executed by the edge intensity image generator 63 in the flowchart in FIG. 18 is omitted because the process is the same as the process in the step S11 executed by the edge intensity image generator 53 in the flowchart in FIG. 4.

Further, the description of the process in the step S92 executed by the edge image generator 64 in the flowchart in FIG. 18 is omitted because the process is the same as the process in the step S12 executed by the edge image generator 54 in the flowchart in FIG. 4.

In the step S93, the target feature value extractor 65 extracts feature values around all edge points. More specifically, target feature value extractor 65 sets feature value extraction areas around all edge points in the edge image supplied from the edge image generator 64, each of the feature value extraction areas having the same radius set by the model feature value extractor 55 in the step S16 in the flowchart in FIG. 4. The target feature value extractor 65 extracts the edge intensity, which is the target feature value, in the same manner as that described with reference to FIG. 17 based on the edge intensity image supplied from the edge intensity image generator 63 and the feature value extraction areas that have been set. The target feature value extractor 65 supplies the extracted target feature values to the matching section 66.

In the step S94, the matching section 66 checks if the target feature values at the points that are on edges of the target image and correspond to the base point and the support points in the model image match any of a plurality of respective model feature values at the base point and the support points in the model image.

Figure 19:
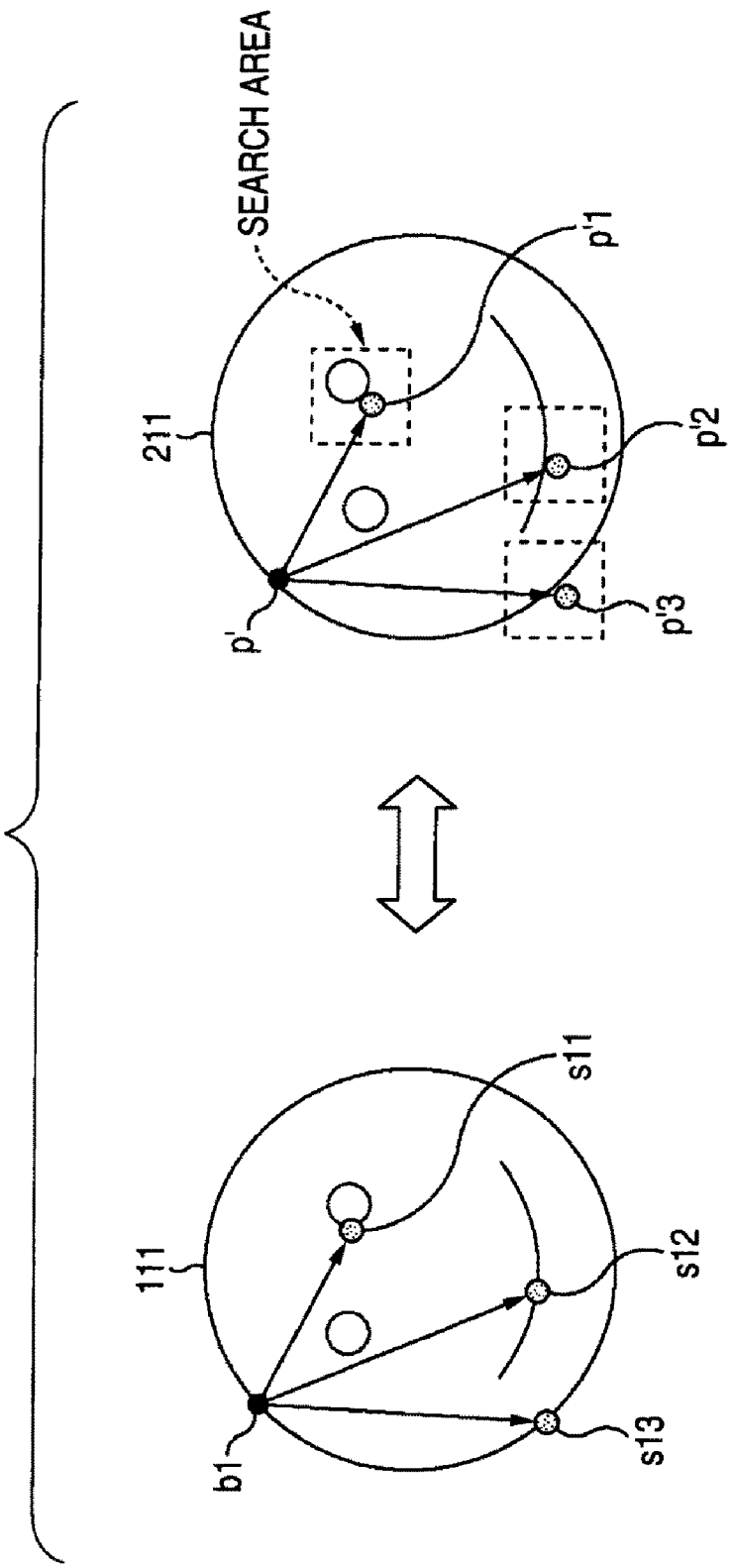
FIG. 19 explains how to check if a model feature value at a base point in a model image matches a target feature value at a point in a target image.

FIG. 19 explains how to check if the model feature value at the base point b1 in the edge image 111 of the model image matches the target feature value at the point p' in the edge image 211 of the target image.

As shown in FIG. 19, for the point p' whose position corresponds to that of the base point b1, the matching section 66 calculates a feature value cost d(b1, p') between the base point b1 and the point p'. Further, for the support points s11, s12, and s13, the matching section 66 searches the point that gives the largest feature value cost d(s1j, p'k) in a search area in the edge image 211 in FIG. 19. The points that undergo the searching are edge points in the search area.

By thus searching the most matching point in the search area, the matching operation can be carried out even when the target image is distorted or changes in size.

As described above, since each of the base point and support points in the model image has a plurality of model feature values, the matching section 66 employs the highest cost among the costs obtained from the model feature values at the base point and the support points in the model image.

Figure 20:
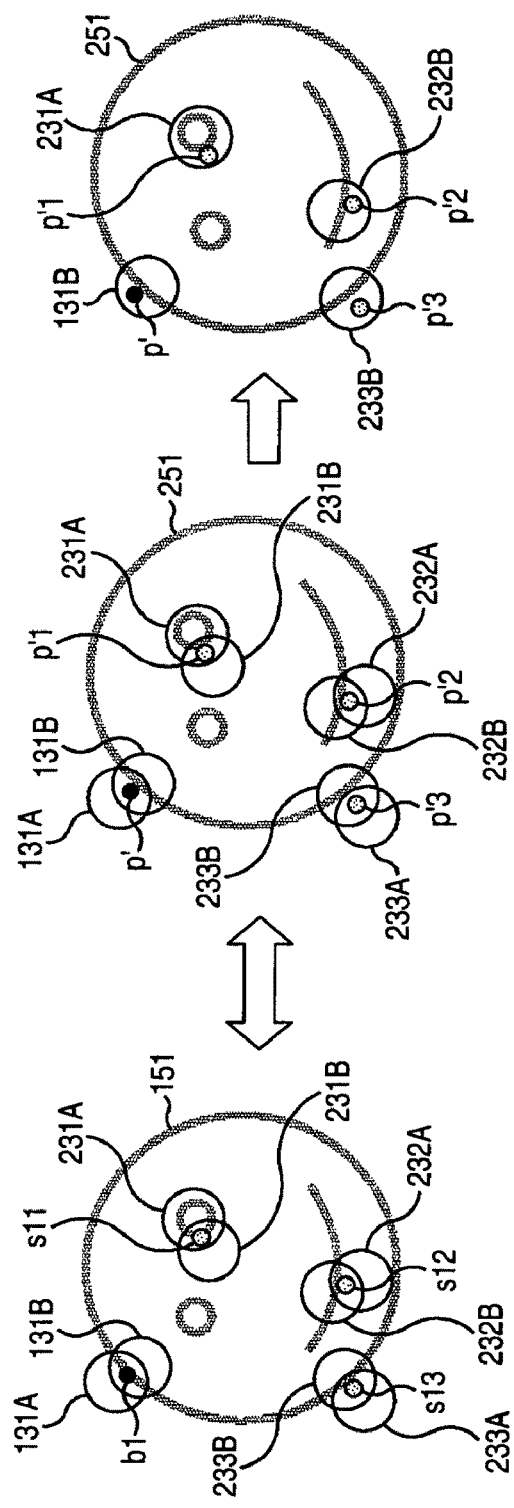
FIG. 20 shows an example of matching operation between a plurality of model feature values and a target feature value.

FIG. 20 shows an example of the matching operation between a plurality of model feature values and a target feature value.

As shown on the left of FIG. 20, feature value extraction areas 131A and 131B are set at the base point b1 in the edge intensity image 151 of the model image, and feature value extraction areas 231A and 231B are set at the support point s11. Similarly, feature value extraction areas 232A and 232B are set at the support point s12, and feature value extraction areas 233A and 233B are set at the support point s13.

As shown at the center of FIG. 20, when the matching section 66 checks if the model feature values in the feature value extraction areas set in the edge intensity image 151 of the model image match the target feature values in the edge intensity image 251 of the target image, the feature value of the feature value extraction area 131B is selected at the point p' in the target image, and the feature value of the feature value extraction area 231A is selected at the point p'1 in the target image, as shown on the right of FIG. 20. Further, the feature value of the feature value extraction area 232B is selected at the point p'2 in the target image, and the feature value of the feature value extraction area 233B is selected at the point p'3 in the target image.

In this way, the target image recognition unit 32 checks if a plurality of model feature values match a target feature value for each of the sampling points (the base point and the support points), and selects the feature values that give the highest feature value cost as a matching pair. The matching operation can thus be carried out even when there is a complicated background or the object changes in appearance.

After the matching operation has thus been carried out for all the base point and support points, the sum of the resultant feature value costs is expressed by the equation (8):

$$\text{Cost}(b1, p') = d(b1, p) + \frac{1}{N}\sum \alpha\beta d(s1j, p'k) \quad (8)$$

In the equation (8), N represents the number of support points, and α and β represent angle and distance penalty costs, respectively, which become smaller as the support points deviate from the local constraint in the model image.

Now, let m be a sampling point in the model image, and t be the point corresponding thereto in the target image. A feature value cost function d(m, t) indicative of the distance between local feature values is expressed by a normalized correlation function as expressed by the equation (9):

$$d(m, t) = \frac{\sum (fm(k) - fm')(ft(k) - ft')}{\sqrt{\sum (fm(k) - fm')^2 \sum (ft(k) - ft')^2}} \quad (9)$$

In the equation (9), fm and ft represent feature value vectors in the model image and the target image, respectively, and fm' and ft' represent the average values of the respective feature value vectors.

The matching section 66 calculates the feature value costs expressed by the equation (8) for all the edge points in the target image for each of the base points in the model image, and assigns the point with the highest cost as the point corresponding to that base point.

When the number of base points in the model image is q, the thus obtained information includes the following items.

That is, there are provided the coordinates (mxi, myi) in the model image and the coordinates (txi, tyi) in the target image (i is an integer ranging from 1 to q).

Returning back to the description of the flowchart in FIG. 18, in the step S95, the object identifier 67 removes mismatching pairs.

That is, the matching pairs between the model image and the target image acquired in the step S94 include many outliers (mismatching pairs) because the process in the step S94 is a local matching process. The object identifier 67 removes such outliers.

When the object contained in the model image is the same as the object contained in the target image, a matching pair needs to satisfy the following constraint condition when the sampling point in the model image is (mx, my) and the point corresponding thereto in the target image is (tx, ty).

$$\theta = \tan^{-1}\left(\frac{my}{mx}\right) \quad (10)$$
$$r = sqrt(mx^2 + my^2)$$
$$dx = tx - r*\cos(\theta)$$
$$dy = ty - r*\sin(\theta)$$

In the equation (10), dx represents the amount of shift in the x-axis direction, and dy represents the amount of shift in the y-axis direction.

Figure 21:
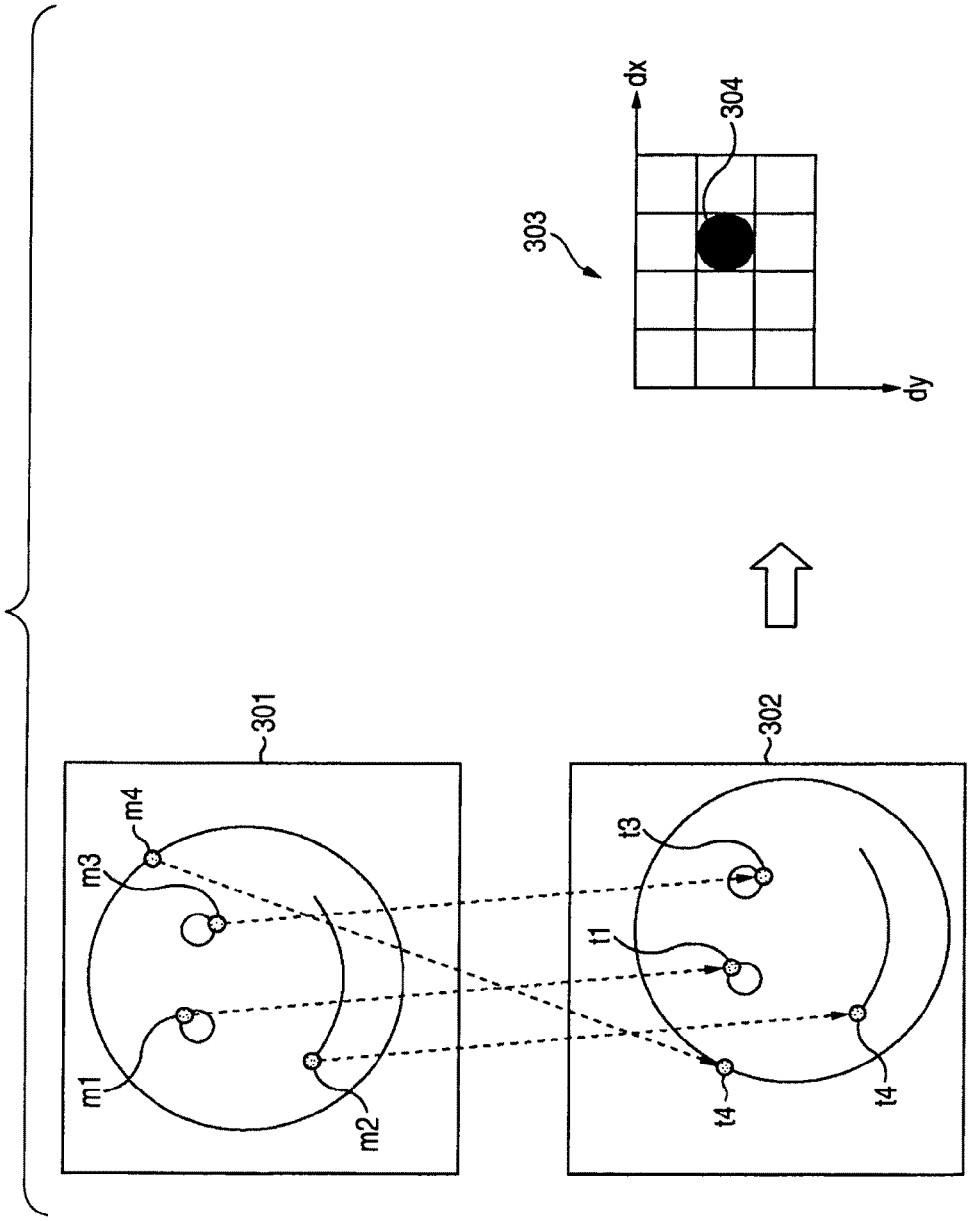
FIG. 21 explains how to remove outliers.

FIG. 21 shows how to use the constraint condition to remove outliers.

In FIG. 21, sampling points m1, m2, m3, and m4 in a model image 301 correspond to edge points t1, t2, t3, and t4 in a target image 302. That is, in FIG. 21, mi-ti (i is an integer ranging from 1 to 4) denotes a matching pair. The object identifier 67 uses the equation (10) to calculate the amounts of shifts dx and dy for each of the pairs. The object identifier 67 votes the calculated amounts of shifts in a vote space 303 prepared in advance.

When the object contained in the model image is the same as the object contained in the target image, there are a large number of pairs that satisfy the constraint condition expressed by the equation (10), so that a peak 304 is formed in the resultant final vote space 303. Since the peak value represents the number of matching pairs, outliers are removed by extracting the pairs voted for the peak provided that the peak is sufficiently large.

For example, in FIG. 21, m1-t1, m2-t2, and m3-t3 have the same amount of shift, so that they are voted in the same vote space. However, m4-t4 is voted in a different vote space and detected as an outlier.

Returning back to the description of the flowchart in FIG. 18, in the step S96, the object identifier 67 acquires final matching pairs, and the process is completed. In this way, for example, when the number of resultant matching pairs is sufficiently larger than a predetermined value, the object identifier 67 can identify the object contained in the input target image with the object contained in the model image of interest.

The object recognition apparatus 11 can thus check if the model image matches the target image to identify the object in the model image with the object in the target image.

As described above, by using a local feature value determined by a reference circle, an object can be more reliably recognized even when the object has a partially hidden portion. That is, by using reference circles having various sizes, even when the object to be recognized has a hidden portion, the reference circle corresponding to the portion that is not hidden can be used to identify the object in the target image with the object in the model image.

Further, by using feature values at a point of interest and the surrounding points, like the base point and support points, as well as the positional relationship thereof as a constraint condition, the points in the target image that correspond to those points can be more accurately detected.

In the invention, an edge point is used as a highly reproducible point, and the search area for the edge point is limited in the matching process, allowing reduction in the amount of computation and hence efficient matching.

In the above description, although only one base point is established for one reference circle, a plurality of base points can be set in one reference circle. In this case, the matching can be carried out in a stable manner even when the edge point corresponding to one base point is located in a partially hidden portion in the target image.

In the above description, the base point and the support points are determined by establishing a local reference circle. In this case, the shape of the reference figure is not limited to a circle, but may be any other shape as long as it is a local closed curve.

It is noted that any target image can generally be processed by generating differently scaled model images and differently angled model images for one model image.

Further, the object recognition apparatus 11 may be configured to learn which particular feature value extraction area is used among a plurality of feature value extraction areas in the course of repetitive object recognition. That is, for feature value extraction areas set inside and outside the contour of an object, for example, the feature value extraction area set inside will be more frequently used in the matching process than the feature value extraction area set outside, which is closer to the background. The object recognition apparatus 11 may therefore learn this fact by updating the model dictionary 56 accordingly.

As described above, an object in an image can be recognized by checking if a feature value of a model image matches a feature value of a target image. Further, an object can be more reliably recognized even in a typical image containing a partially hidden portion or a complicated background by extracting a model image feature value, which is the feature value of the model image, from each of a plurality of feature value extraction areas in the neighborhood of each feature point that is on an edge of the model image and provided to extract the model image feature value, and checking if an input image feature value, which is the feature value of an input image, at the point that is on an edge of the input image and corresponds to the feature point matches any of the plurality of model image feature values at the feature point.

Further, an advantageous effect can be provided as described above, in which by assigning a plurality of model feature values to one sampling point (a base point or a support point) in a reference circle, at least one of the plurality of model feature values is less likely affected by background noise, so that even when the target image contains a complicated background, a pair of feature values corresponding to each other more likely become a matching pair even in the contour portion of the object.

To provide such an advantageous effect, in the example described above, two feature value extraction areas are set for one sampling point (a base point or a support point), and one type of model feature value is extracted from each of the two feature value extraction areas.

In the example shown in FIG. 14, for example, the two feature value extraction areas 131A and 131B are set on the line connecting the center of the reference circle R1 to the base point b1, which is one of the sampling points on the reference circle R1. Then, one type of model feature value is extracted from each of the feature value extraction areas 131A and 131B. That is, two model feature values are extracted for one sampling point (the base point or any of the support points).

However, "two" model feature values in FIG. 14 are only by way of example because a sufficient number of model feature values to be extracted is two or more.

The feature value extraction areas to be set are not limited to the two inside and outside the reference circle R1 as described above. By setting a plurality of feature value extraction areas in the neighborhood of a sampling point, each sampling point can have a plurality of feature values, and hence the effect described above becomes more advantageous.

Further, for example, the number of types of the model feature value extracted from one feature value extraction area is not limited one, which is the case described above, but may be two or more. In this case, one sampling point (a base point or a support point) has a plurality of feature value extraction areas, and multiple types of model feature values are extracted from each of the feature value extraction areas. As a result, each sampling point can have a larger number of feature values, and hence the effect described above becomes further more advantageous.

Specifically, for example, as shown in FIG. 22, the model feature value extractor 55 sets two feature value extraction areas 131A and 131B on the line connecting the center of the reference circle R1 to the base point b1, which is one of the sampling points on the reference circle R1. The processes hitherto are basically the same as those in the example shown in FIG. 14.

Then, in the example shown in FIG. 14, the model feature value extractor 55 extracts one predetermined type of model feature value from the feature value extraction area 131A and the same type of model feature value from the feature value extraction area 131B.

In contrast, in the example shown in FIG. 22, the model feature value extractor 55 extracts a first type of model feature value (the feature value A1 labeled in FIG. 22) and a second type of model feature value (the feature value A2 labeled in FIG. 22) from the feature value extraction area 131A. The model feature value extractor 55 also extracts a model feature value of the first type (the feature value B1 labeled in FIG. 22) and a model feature value of the second type (the feature value B2 labeled in FIG. 22) from the feature value extraction area 131B.

Thus, the number of model feature values extracted from the base point b1 is two in the example shown in FIG. 14, whereas the number is four in the example shown in FIG. 22.

Therefore, while an advantageous effect has been described in the example shown in FIG. 14, in which by assigning a plurality of model feature values to one sampling point, at least one of the plurality of model feature values is less likely affected by background noise, so that even when the target image contains a complicated background, a pair of feature values corresponding to each other more likely become a matching pair even in the contour portion of the object, such an advantageous effect becomes more advantageous in the example shown in FIG. 22.

The types to be employed as the model feature value are not limited to specific ones as long as they are different from one another.

For example, one of the multiple types to be employed can be the type described with reference to FIG. 17, that is, the edge intensity in each of the areas obtained by dividing a feature value extraction area (hereinafter simply referred to as an edge intensity), the edge intensities in the feature value extraction area expressed in the two-dimensional histogram.

Further, for example, since each of RGB layers has successive values ranging from 0 to 255, the image in each of the layers can be handled in the same manner as that used for the edge intensity image. The model feature value extractor 55 can then create a two-dimensional histogram for each of the colors R, G, and B using the same procedure as that used for the edge intensity, that is, the procedure described with reference to FIGS. 16 and 17 and extract such a type of value as the model feature value. The thus extracted type(s) (hereinafter referred to as a color template(s)) can be employed as one or three of a plurality of types. The reason why the number of types is one or three in the above sentence is that RGB as a whole may be regarded as one type, or each of the RGB layers may be regarded as an individual type, that is three types in total.

The information used to create the color template(s) is not limited to RGB, but information associated with any other color space can be employed.

Figure 23:
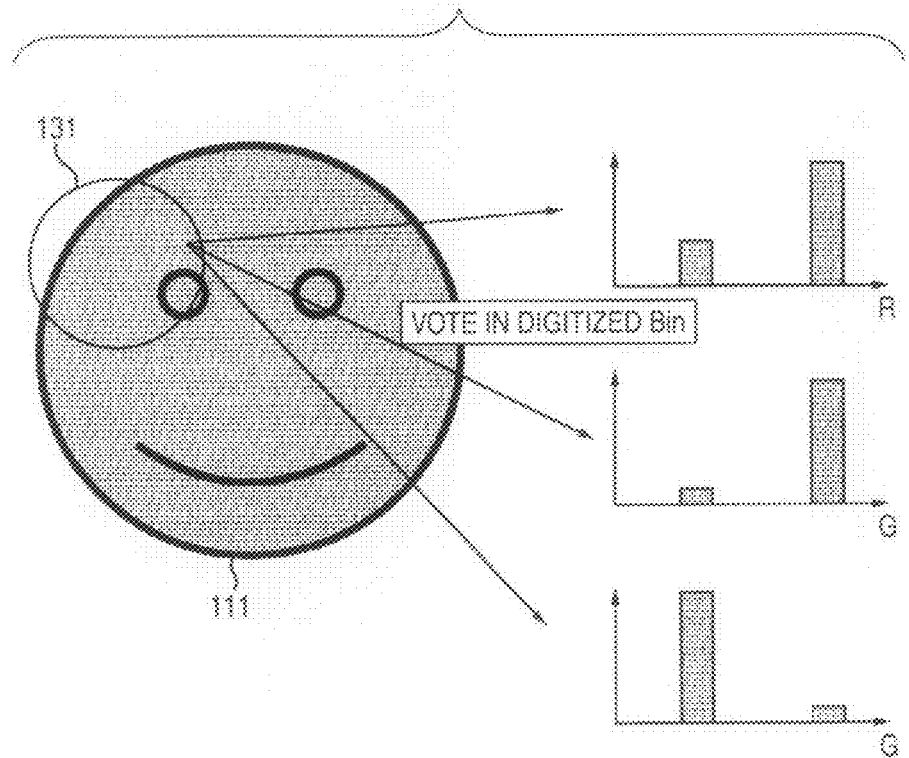
FIG. 23 explains a color histogram, which is one type of feature value.

Further, for example, as shown in FIG. 23, the model feature value extractor 55 can digitize each of the color values present in the feature value extraction area 131 and vote it in a bin set in advance so as to create a color histogram. The model feature value extractor 55 can then extract such a type of value as the model feature value. The thus extracted type(s) (hereinafter referred to as a color histogram(s)) can be employed as one or three of a plurality of types. The reason why the number of types is one or three in the above sentence is the same as that described above with reference to the color template.

Although the information used to create the color histogram is RGB in the example shown in FIG. 23, the information is not limited to RGB, but information associated with any other color space can be employed.

In either of the cases where one of the types of model feature value described above is employed, it is possible to handle a situation where an object changes in appearance or scale by employing an extraction process in which the feature value extraction area 131 or a value is roughly divided and the sum of the divided areas or values is used.

As described above the model feature value extractor 55 can set a plurality of feature value extraction areas 131 for one sampling point (a base point or a support point), and multiple types of feature values can be extracted from each of the feature value extraction areas 131.

As a result, letting N be the number of support points for each base point, M be the number of feature value extraction areas 131, and L be the number of types of extracted model feature value, one model image provides the following information, which is then registered in the model dictionary 56.

That is, one model image provides the position of the base point (bx, by), the relative positions of the feature value extraction areas (fbθi, fbri) for the base point, and the feature values bfik of the base point. The character i is an integer ranging from 1 to M, and the character k is an integer ranging from 1 to L.

Similarly, one model image provides the relative positions of the support points (θj, rj) (j is an integer ranging from 1 to N), the relative positions of the feature value extraction areas (fsθi, fsri) for each of the support points, and the feature values sfik (k is an integer ranging from 1 to L) of each of the support points.

A description will now be made of processes carried out in the target image recognition unit 32 when multiple types of model feature values are thus extracted from one feature value extraction area 131. The description will be, however, primarily made of the difference from the processes carried out in the target image recognition unit 32 described above when one type of feature value is extracted from one feature value extraction area 131, and the description of the common points will be omitted as appropriate.

The target feature value extractor 65 extracts a target feature value, which is the feature value of a target image, for each of the multiple types of extracted model feature values. The target feature value extractor 65 supplies the multiple types of extracted target feature values of the target image to the matching section 66.

The matching section 66 checks if the target feature values of the target image extracted in the target feature value extractor 65 match the model feature values of the model image registered in the model dictionary 56 for each of the types, and acquires matching pairs between the model image and the target image.

That is, the matching section 66 carries out the process in the step S94 in FIG. 18 for each of the types of model feature values.

For example, when the matching operation is carried out with respect to the edge image 111 in FIG. 22 described above, the matching section 66 checks if the plurality of model feature values of the first type match the target feature value of the first type for each of the sampling points (the base point and the support points), and selects a pair of feature values that give the highest feature value cost as a matching pair candidate, as shown in FIG. 24.

Similarly, the matching section 66 checks if the plurality of model feature values of the second type match the target feature value of the second type for each of the sampling points (the base point and the support points), and selects a pair of feature values that give the highest feature value cost as a matching pair candidate, as shown in FIG. 25.

In this operation, two feature value extraction areas are set for each of the sampling points (the base point and the support points), and a feature value of the first type and a feature value of the second type are extracted from each of the feature value extraction areas. Therefore, in the examples shown in FIGS. 24 and 25, the model feature value of the first type is labeled as the feature value A1 and the model feature value of the second type is labeled as the feature value A2 for the feature value extraction area with the character A according to the notation in FIG. 22. Similarly, the model feature value of the first type is labeled as the feature value B1 and the model feature value of the second type is labeled as the feature value B2 for the feature value extraction area with the character B.

For example, as shown in the middle of FIG. 24, the matching section 66 checks if the model feature values of the first type (the feature values A1 and B1) in the feature value extraction areas set for the edge intensity image 151 of the model image match the target feature values of the first type in the edge intensity image 251 of the target image. In this case, as shown on the right of FIG. 24, the feature value B1 of the feature value extraction area 131B is selected at the point p' in the target image, and the feature value A1 of the feature value extraction area 231A is selected at the point p'1 in the target image. The feature value B1 of the feature value extraction area 232B is selected at the point p'2 in the target image, and the feature value B1 of the feature value extraction area 233B is selected at the point p'3 in the target image.

Further, independent of the matching using the model feature values of the first type (the feature value A1 and the feature value B1) described above, as shown in the middle of FIG. 25, for example, the matching section 66 checks if the model feature values of the second type (the feature values A2 and B2) in the feature value extraction areas set for the edge intensity image 151 of the model image match the target feature values of the second type in the edge intensity image 251 of the target image. In this case, as shown on the right of FIG. 25, the feature value B2 of the feature value extraction area 131B is selected at the point p' in the target image, and the feature value A2 of the feature value extraction area 231A is selected at the point p'1 in the target image. The feature value B2 of the feature value extraction area 232B is selected at the point p'2 in the target image, and the feature value B2 of the feature value extraction area 233B is selected at the point p'3 in the target image.

The selection results of the model feature values shown in FIGS. 24 and 25 are only by way of example. That is, feature values of the first and second types are independent of and hence separate from each other, and the matching operation is carried out independently for each of the types as described above. Therefore, of course, depending on the target image, the feature value A1 may be selected for the first type and the feature value B2 may be selected for the second type at the point p', p'1, p'2, or p'3. Alternatively, depending on the target image, the feature value B1 may be selected for the first type and the feature value A2 may be selected for the second type at the point p', p'1, p'2, or p'3.

In the above description, the number of types of model feature value is two, the first and second types, for the sake of easy understanding of the invention. However, the number of types of model feature value is not, of course, limited to two, but may be L (L is an integer equal to or greater than two). In this case, letting q be the number of base points in the model image, the matching process for each of the L types of feature values is independently carried out for each of the q base points. As a result, the following information is finally obtained.

That is, the coordinates (mxij, myij) in the model image, the coordinates (txij, tyij) in the target image, and the largest cost values cost_i_j (i is an integer ranging from 1 to q, and j is an integer ranging from 1 to L) are obtained.

For one base point of interest, matching pair candidates for the L types of feature values will be acquired. In this case, all the matching pair candidates for the L types of feature values can be final matching pairs.

In this embodiment, however, the matching section 66 tries to select a final matching pair among the matching pair candidates for the L types of feature values based on the stored cost values for each of the base points. It is noted that the number of matching pairs to be selected is not limited to one, as will be described later.

The method for selecting a matching pair when the L types of feature values include a type having a scale different from the others differs from the method for selecting a matching pair when all the L types of feature values have the same scale. Examples of the selection method for both the cases will be described below.

First, an example of the selection method when the L types of feature values include a type having a scale different from the others will be described.

For example, suppose that L=2 and that a first type of feature value is the edge intensity and a second type of feature value is the color histogram.

In this case, since the scales in the feature spaces for the two types of feature values are different, their cost values cannot simply be compared with each other. In this case, a threshold value indicative of reliability may be set for the cost value of each type of feature value. For example, the threshold value for the edge intensity (the feature value of the first type) is thresh1, and the threshold value for the color histogram (the feature value of the second type) is thresh2.

In this case, the matching section 66 judges whether or not the cost value of a matching pair candidate for the edge intensity (the feature value of the first type) is greater than the threshold value thresh1 for each base point. When the cost value is greater than the threshold value thresh1, the matching section 66 employs the matching pair candidate as the matching pair.

Similarly, the matching section 66 judges whether or not the cost value of a matching pair candidate for the color histogram (the feature value of the second type) is greater than the threshold value thresh2 for each base point. When the cost value is greater than the threshold value thresh2, the matching section 66 employs the matching pair candidate as the matching pair.

The comparison is thus carried out by using a separate threshold value for each of the types of feature values, both the feature value costs of the two types may be greater than the respective threshold values for the same base point. In such a case, the matching section 66 judges that both the matching pairs of the two types have sufficiently high reliability, and employs both as the matching pair even when the points corresponding to the same base point are different from each other.

Next, an example of the selection method when the L types of feature values do not include a type having a scale different from the others, that is, when all the types of feature values have the same scale, will be described.

For example, suppose that L=3 and that the R, G, and B layers in the color template are first, second, and third types of feature values, respectively.

In this case, the three types of feature values, R, G, and B, can be handled as those having the same scale. Therefore, the matching section 66 may select the matching pair that gives the highest cost value from the matching pair candidates for each base point.

By carrying out the above processes, it is possible to acquire a matching pair of each base point and the corresponding target point in the final model. As described above, however, for some of the base points, a plurality of corresponding points are obtained in some cases.

That is, by carrying out the above processes, each of the base points in the model has feature values extracted from a plurality of feature value extraction areas provided around that base point, and the feature value that gives the highest score is selected in the matching process from the thus extracted feature values. It is therefore possible to handle environmental changes, in which, for example, the background gets complicated or the view changes.

Further, each of the base points in the model has multiple types of feature values, and a matching pair is selected from the resultant matching pair candidates by narrowing them using the cost values, which are the results of the matching operation for the feature values of the multiple types. Therefore, the matching pair selection is more robust to the environmental changes described above than the matching pair selection using one type of feature value.

Further, since the feature value to be used is determined in an adaptive manner at the time of matching for each of the base points, it is not necessary to select one feature value in advance.

When the process in the step S94 in FIG. 18, which provides such various advantageous effects, is completed, the process in the step S95 is carried out. Since the processes in the step S95 and the following steps are basically the same as those described above, the description thereof will be omitted.

While the embodiments in which the invention is applied to an object recognition apparatus have been described, the invention is applicable, for example, to an information processing apparatus that recognizes an object in an image through a comparison process.

The series of processes described above can be carried out by either hardware or software. When the series of processes is to be carried out by software, a program that forms the software is installed from a program recording medium into a computer incorporated in dedicated hardware or, for example, a general-purpose personal computer having various programs installed therein to execute various functions.

Figure 26:
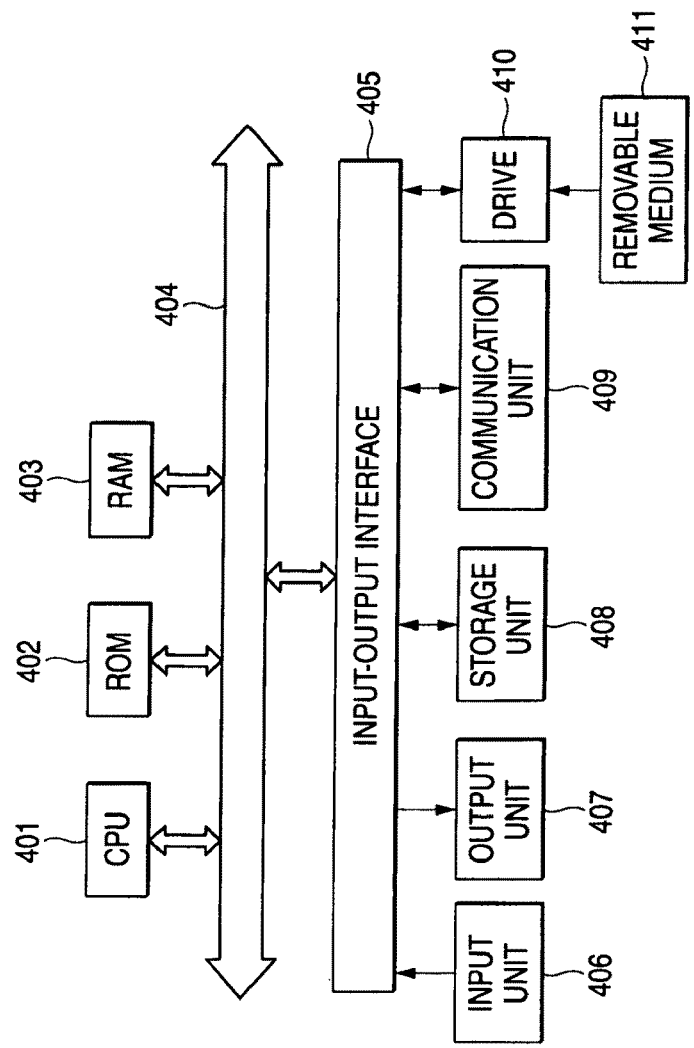
FIG. 26 is a block diagram showing an exemplary configuration of a personal computer.

FIG. 26 is a block diagram showing an exemplary configuration of a personal computer for executing the series of processes described above in the form of a program. A CPU (Central Processing Unit) 401 executes various processes according to the program stored in a ROM (Read Only Memory) 402 or a storage section 408. A RAM (Random Access Memory) 403 stores the program executed by the CPU 401 and associated data used by the CPU 401 as appropriate. The CPU 401, the ROM 402 and the RAM 403 are connected to each other via a bus 404.

The CPU 401 is also connected to an input/output interface 405 via the bus 404. The input/output interface 405 is connected to an input section 406 including a keyboard, a mouse, and a microphone, and an output section 407 including a display and a loudspeaker. The CPU 401 executes various processes in response to commands inputted from the input section 406. The CPU 401 then outputs the results of the processes to the output section 407.

The storage section 408 connected to the input/output interface 405 includes a hard disk drive and stores the program executed by the CPU 401 and various data used by the CPU 401. A communication section 409 communicates with external devices via a network, such as the Internet and a local area network.

The program may be acquired via the communication section 409 and stored in the storage section 408.

A drive 410 connected to the input/output interface 405, into which a removable medium 411, such as a magnetic disk, an optical disk, a magneto-optical disk and a semiconductor memory, is loaded, drives such a medium and acquires a program and data recorded therein. The acquired program and data are transferred to and stored in the storage section 408 as necessary.

Examples of the program recording medium that stores a program that is installed in the computer and becomes executable by the computer are a removable medium 411, which is a packaged medium, such as a magnetic disk (including a flexible disc), an optical disk (including a CD-ROM (Compact Disk-Read Only Memory) and a DVD (Digital Versatile Disc)), an magneto-optical disk, and a semiconductor memory, the ROM 402 that stores a program in a temporal or permanent manner, and a hard disk drive that forms the storage section 408, as shown in FIG. 26. The storage of a program onto the program recording medium is carried out as necessary by using a wired or wireless communication medium, such as a local area network, the Internet, and digital satellite broadcasting, via the communication section 409, which is the interface, such as a router and a modem.

In this text, steps that describe a program stored on the recording medium include not only processes that are executed in a specified order in a time-series manner but also processes that are not necessarily executed in a time-series manner but executed in parallel or individually.

The embodiments of the invention are not limited to the embodiments described above, but various changes can be made to the extent that these changes do not depart from the spirit of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that compares an input image with a model image to identify the subject of the input image with the subject of the model image and that includes a processor, the apparatus comprising:

feature value extraction means for setting feature points, each of which is on an edge of the model image and provided to extract a model image feature value, which is the feature value of the model image, and extracting the model image feature value from each of a plurality of feature value extraction areas in the neighborhood of each of the feature points; and matching means for determining whether an input image feature value, which is the feature value of the input image, at the point that is on an edge of the input image and corresponds to a feature point matches any of the plurality of model image feature values at the feature point, wherein the feature value extracting means selects a plurality of edge points as feature points based on an entropy value indicating how the plurality of edge points are scattered.

2. The information processing apparatus according to claim 1,
wherein the feature value extraction means extracts multiple types of the model image feature value from each of the plurality of feature value extraction areas, and
the matching means carries out the matching operation for each of the multiple types.

3. The information processing apparatus according to claim 1,
wherein the feature value extraction means extracts the model image feature value from each of the plurality of feature value extraction areas, the model image feature value having successive values for each pixel in the neighborhood of an edge of the model image.

4. The information processing apparatus according to claim 1,
wherein the feature value extraction means extracts an edge intensity from each of the plurality of feature value extraction areas, the edge intensity obtained in the neighborhood of an edge of the model image.

5. The information processing apparatus according to claim 1,
wherein the feature value extraction means extracts the model image feature value, which is the feature value of the model image, from each of the plurality of feature value extraction areas in the neighborhood of the feature point defined as the point where a reference circle determined in such a way that a relatively large number of edges of the model image are contained therein intersects an edge of the model image.

6. The information processing apparatus according to claim 1,
wherein the feature value extraction means extracts the feature value from each of small areas obtained by radially segmenting each of the feature value extraction areas that is formed of a plurality of concentric circles having different radii, each of the segmented areas having a predetermined angle, and surrounded by the outermost concentric circle, the extracted feature values expressed by a two-dimensional histogram for the distance and angle from the center of the concentric circles.

7. The information processing apparatus according to claim 1 further comprising:
identification means for identifying the subject of the input image with the subject of the model image when the number of matching pairs, which is the result of the operation for determining whether the input image feature value matches any of the plurality of model image feature values, is greater than a predetermined value.

8. An information processing method used in an information processing apparatus that compares an input image with a model image to identify the subject of the input image with the subject of the model image, the method comprising the steps of:
setting feature points, each of which is on an edge of the model image and provided to extract a model image feature value, which is the feature value of the model image, and extracting the model image feature value from each of a plurality of feature value extraction areas in the neighborhood of each of the feature points; and
determining whether an input image feature value, which is the feature value of the input image, at the point that is on an edge of the input image and corresponds to a feature point matches any of the plurality of model image feature values at the feature point,
wherein the step of setting feature points selects a plurality of edge points as feature points based on an entropy value indicating how the plurality of edge points are scattered.

9. A non-tranitory computer readable medium storing a program that causes a computer to carry out a process for comparing an input image with a model image to identify the subject of the input image with the subject of the model image, the process comprising the steps of:
setting feature points, each of which is on an edge of the model image and provided to extract a model image feature value, which is the feature value of the model image, and extracting the model image feature value from each of a plurality of feature value extraction areas in the neighborhood of each of the feature points; and
determining whether an input image feature value, which is the feature value of the input image, at the point that is on an edge of the input image and corresponds to a feature point matches any of the plurality of model image feature values at the feature point,
wherein the step of setting feature points selects a plurality of edge points as feature points based on an entropy value indicating how the plurality of edge points are scattered.

10. An information processing apparatus that compares an input image with a model image to identify the subject of the input image with the subject of the model image, the apparatus comprising:
a feature value extractor configured to set feature points, each of which is on an edge of the model image and provided to extract a model image feature value, which is the feature value of the model image, and extracting the model image feature value from each of a plurality of feature value extraction areas in the neighborhood of each of the feature points; and
a matching section configured to determine whether an input image feature value, which is the feature value of the input image, at the point that is on an edge of the input image and corresponds to feature point matches any of the plurality of model image feature values at the feature point,
wherein the feature value extractor selects a plurality of edge points as feature points based on an entropy value indicating how the plurality of edge points are scattered.

* * * * *